US009354339B2

(12) United States Patent
Bongiovanni

(10) Patent No.: US 9,354,339 B2
(45) Date of Patent: May 31, 2016

(54) SYSTEMS AND METHODS FOR COMBINING TRIAXIAL GEOPHONE DATA FOR LOCALIZING NEARBY TRANSIENT SEISMIC SOURCES

(71) Applicant: RAYTHEON BBN TECHNOLOGIES CORP., Cambridge, MA (US)

(72) Inventor: Kevin Bongiovanni, Portsmouth, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 302 days.

(21) Appl. No.: 14/103,467

(22) Filed: Dec. 11, 2013

(65) Prior Publication Data

US 2015/0160358 A1    Jun. 11, 2015

(51) Int. Cl.
*G01V 1/28* (2006.01)
*G01V 1/30* (2006.01)

(52) U.S. Cl.
CPC .............. *G01V 1/284* (2013.01); *G01V 1/307* (2013.01); *G01V 2210/63* (2013.01); *G01V 2210/65* (2013.01)

(58) Field of Classification Search
CPC ........................... G01V 1/307; G01V 2210/63
See application file for complete search history.

(56) References Cited

U.S. PATENT DOCUMENTS 2,658,578 A * 11/1953 Oliphant ................ G01V 1/284
  367/58
4,300,220 A * 11/1981 Goff ......................... G01V 1/16
  181/401

4,757,480 A * 7/1988 Gutowski ............... G01V 1/364
  367/44
2009/0259406 A1 * 10/2009 Khadhraoui ........... G01V 1/288
  702/14

FOREIGN PATENT DOCUMENTS

| CN | 103048684 A | 4/2013 |
| EP | 2128653 A2 | 12/2009 |
| WO | 2007006145 A1 | 1/2007 |

OTHER PUBLICATIONS

Anderson, Sören, "Analysis of a Polarized Seismic Wave Model," IEEE Transactions on Signal Processing, vol. 44, No. 2, Feb. 1996.
De Meersman, K., "Signal Extraction and Automated Polarisation Analysis of Multi-Component Array Data," School of Earth and Environment, University of Leeds, May 29, 2006.

(Continued)

*Primary Examiner* — Ari M Diacou
(74) *Attorney, Agent, or Firm* — Lando & Anastasi, LLP

(57) ABSTRACT

In one embodiment, a method of processing seismic data using a single triaxial geophone is disclosed, where the method comprises acts of calibrating the single triaxial geophone sensor to determine a position and an orientation relative to a surrounding environment, configuring the single triaxial geophone sensor to receive seismic data from the surrounding environment along three orthogonal axes, measuring, with the single triaxial geophone sensor, a plurality of time series of seismic data from the surrounding environment for the three orthogonal axes, storing, with a computer system coupled to the single triaxial geophone sensor, the time series of seismic data from the surrounding environment for the three orthogonal axes, and processing, with the computer system, the time series of seismic data to identify a plurality of seismic waves of different polarizations.

8 Claims, 19 Drawing Sheets

(56) References Cited

OTHER PUBLICATIONS

Jurkevics, Andy, "Polarization Analysis of Three-Component Array Data," Bulletin of the Seismological Society of America, vol. 78, No. 5, Oct. 1988, pp. 1725-1743.

Roueff et al., "Estimation of Polarization on Time-Scale Plane for Seismic Wave Separation," Laboratoire des Images et des Signaux (LIS), France.

Roueff et al., "Estimation of Polarization Parameters Using Time-Frequency Representations and its Application to Waves Separation," Signal Processing, vol. 86, 2006, pp. 3714-3731.

Samson, J.C. et al., "Data-Adaptive Polarization Filters for Multichannel Geophysical Data," Society of Exploration Geophysicists, 1981.

Stockwell, R. G., "A Basis for Efficient Representation of the S-Transform," Northwest Research Associates, Colorado Research Associates Division, 2006.

Takahashi et al., "A Processing Technique for Three Component Seismic Data: Use of Polarisation Characteristics," ASEG/SEG Conference—Adelaide, 1988.

Vidale, John E., "Complex Polarization Analysis of Particle Motion," Bulletin of the Seismological Society of America, vol. 76, No. 5, Oct. 1986, pp. 1393-1405.

Jackson et al., "Principal Component Transforms of Triaxial Recordings by Singular Value Decomposition", Geophysics, vol. 56, No. 4, Apr. 4, 1991, pp. 528-533.

Leprettre et al., "Three-Component Signal Recognition Using Time, Time-Frequency, and Polarization Information-Application to Seismic Detection of Avalanches", IEEE Transactions on Signal Processing, IEEE Service Center, New York, NY, US, vol. 46, No. 1, Jan. 1, 1998, pp. 83-85, 87, 89.

\* cited by examiner

SYSTEMS AND METHODS FOR COMBINING TRIAXIAL GEOPHONE DATA FOR LOCALIZING NEARBY TRANSIENT SEISMIC SOURCES

FEDERALLY SPONSORED RESEARCH

This invention was made with government support under Contract Number W912HZ-10-C-0120 awarded by the U.S. Army Corp of Engineers Research and Development Center. The U.S. government has certain rights in this invention.

BACKGROUND

The collection and processing of seismic data for the purpose of identifying the source of seismic activity has traditionally involved the use of arrays of sensors capable of measuring seismic activity over a distributed area. Upon collecting seismic data in multiple geographically distinct locations, various types of array signal processing techniques have been utilized to extract information about seismic wave properties, which can help determine the likely location of the seismic source. From a deployment and maintenance perspective, the use of a distributed sensor network for the measurement of seismic data often requires the placement, calibration and synchronization of each sensor in the distributed network. From a signal processing perspective, the use of data collected from a distributed sensor network requires taking into account that properties of the collected seismic signals associated with a single seismic source, such as wave polarization, phase and frequency content, typically vary between sensors in the distributed network.

Existing techniques for the processing of seismic signal data typically utilize band-passed time-domain approaches when extracting information about seismic wave polarization. The use of strictly time-domain approaches for extracting seismic wave polarization typically works well for processing signals received from distant seismic sources where seismic waves of different polarizations, which normally travel at different speeds, can separate sufficiently in time prior to arrival at a particular seismic sensor in the network. When attempts are made to extract wave polarization information from the temporal signals of waves emitted from nearby sources having different polarizations that have not separated sufficiently in time, these polarization extraction methods normally become ill-posed problems. Attempts to determine the direction and location of a seismic source using these methods typically return poor estimates. Existing techniques for processing seismic signal data often use of frequency dependent time windows, such as using a larger time window for lower frequency signals, which suffer from inadequate separation of wave polarization components for nearby seismic sources.

SUMMARY OF INVENTION

Given the limitations of previous techniques for collecting and processing seismic signal data, there exists a need for a system that provides for simpler, quicker deployment and configuration of sensor equipment when collecting seismic signal data as well as robust methods for isolating signals of differing polarizations from nearby seismic sources. These methods are needed especially when travel time between source and sensor might not allow separate detection of multiple seismic waves having different polarizations in different time windows.

Aspects and embodiments are directed to systems and methods for the collection and processing of seismic data utilizing a single triaxial geophone sensor, as well as techniques for digitally transforming and processing the received seismic signal data in a time-frequency representation enabling separation of signals for polarized seismic waves that emanate from nearby seismic sources. In various configurations of the single triaxial geophone sensor, the received seismic signal data that is measured can include velocity data, acceleration data, and displacement data. Unlike fixed in-place arrays of sensors often used for measuring long-range seismic signals, such as earthquakes, various systems and methods described below for measuring nearby subterranean seismic signals use only a single, isolated triaxial geophone sensor. Use of a single sensor provides agility in deployment and configuration, as well as rapid localization capability for detecting the location of a nearby seismic source. A nearby seismic source is one whose distance is at most a few hundred meters from the seismic sensor; unlike a seismic wave emanating from an earthquake whose source is likely tens, hundreds, or even thousands of kilometers from the corresponding seismic sensor. Rapid deployment and fine time-frequency resolution capability can be extremely useful when operating in an environment where time is of the essence for detecting the source of a seismic signal, such as searching for individuals trapped in a collapsed mine or in an avalanche. Various aspects and embodiments are directed to methods for processing received seismic signal data from a nearby source to determine the location of that seismic source based on identified polarization waves.

According to some embodiments, a method of processing seismic data using a single triaxial geophone comprises calibrating the single triaxial geophone sensor to determine a position and an orientation relative to a surrounding environment, configuring the single triaxial geophone sensor to receive seismic data from the surrounding environment along three orthogonal axes, measuring, with the single triaxial geophone sensor, a plurality of time series of seismic data from the surrounding environment for the three orthogonal axes, storing, with a computer system coupled to the single triaxial geophone sensor, the time series of seismic data from the surrounding environment for the three orthogonal axes, and processing, with the computer system, the time series of seismic data to identify a plurality of seismic waves of different polarizations. In some embodiments, the seismic data includes velocity data. In various embodiments, the seismic data includes acceleration data. In further embodiments, the seismic data includes displacement data.

In some embodiments, the processing of the time series of seismic data comprises determining three distinct analytic representations of the plurality of time series of seismic data from the surrounding environment for the three orthogonal axes. The determining of a plurality of analytic representations of the time series of seismic data comprises performing a plurality of Hilbert transformations on the time series of seismic data for the three orthogonal axes. The processing of seismic data comprises transforming the plurality of analytic representations of the time series of seismic data for the three orthogonal axes into a corresponding plurality of time-frequency representations.

In various embodiments, the transforming of the time series of seismic data into the plurality of time-frequency representations comprises performing a plurality of S-transformations on the plurality of analytic representations of the time series of seismic data. In some embodiments, processing of the seismic data further comprises applying a first fixed-width temporal window to the plurality of time-frequency representations to extract a first plurality of time-frequency samples for the three orthogonal axes. In further embodiments, the processing of the seismic data further comprises merging the first plurality of time-frequency samples for the three orthogonal axes into a first matrix. In particular embodiments, the processing of the seismic data further comprises calculating a first singular value decomposition of the first matrix containing the first plurality of time-frequency samples for the three orthogonal axes to determine a first plurality of singular values and a first plurality of singular vectors associated with the first fixed-width temporal window. In various embodiments, the processing of the seismic data further comprises ordering the first plurality of singular values based on numerical value, determining a first signal to noise ratio indicative of a seismic source, and determining a first extent of signal polarization present in the seismic data.

In some embodiments, the determining an extent of signal polarization present in the seismic data further comprises calculating a first metric using the ordered first plurality of singular values to be greater than a threshold to identify a linearly polarized p-wave. In various embodiments, the determining of an extent of signal polarization present in the seismic data further comprises calculating a second metric using the ordered first plurality of singular values to be greater than a threshold to identify an s-wave.

In various embodiments, the processing of the seismic data further comprises applying a second fixed-width temporal window time-shifted from the first fixed-width temporal window to the plurality of time-frequency representations to extract a second plurality of time-frequency-samples for the three orthogonal axes, merging the second plurality of time-frequency samples for the three orthogonal axes into a second matrix, calculating a second singular value decomposition of the second matrix containing the second plurality of time-frequency samples for the three orthogonal axes to determine a second plurality of singular values and a second plurality of singular vectors associated with the second fixed-width temporal window, ordering the second plurality of singular values based on numerical value, determining a second signal to noise ratio indicative of the seismic source, determining a second extent of signal polarization present in the seismic data, and calculating a second metric using the ordered second plurality of singular values to identify the linearly polarized p-wave. In some embodiments, the processing of the seismic data further comprises calculating the second metric using the ordered second plurality of singular values to identify the presence of the s-wave.

In further embodiments, the processing of the seismic data further comprises repeating the previous actions of applying a second fixed-width temporal window time-shifted from the first fixed-width temporal window to the plurality of time-frequency representations to extract a second plurality of time-frequency-samples for the three orthogonal axes, merging the second plurality of time-frequency samples for the three orthogonal axes into a second matrix, calculating a second singular value decomposition of the second matrix containing the second plurality of time-frequency samples for the three orthogonal axes to determine a second plurality of singular values and a second plurality of singular vectors associated with the second fixed-width temporal window, ordering the second plurality of singular values based on numerical value, determining a second signal to noise ratio indicative of the seismic source, determining a second extent of signal polarization present in the seismic data, and calculating a second metric using the ordered second plurality of singular values to identify the linearly polarized p-wave. For these embodiments, the actions are repeated for a plurality of fixed-width temporal windows that are mutually time-shifted for extracting separate distinct pluralities of time-frequency samples to cover the temporal range of the plurality of time-frequency representations and to determine separate pluralities of singular values and singular vectors associated with each of the separate pluralities of mutually time-shifted time-frequency samples.

In some embodiments, the processing of the seismic data further comprises repeating the actions of calculating the second metric using the ordered second plurality of singular values to identify the presence of the s-wave for the plurality of fixed-width temporal windows that are mutually time-shifted to identify the presence of the s-wave in each of the plurality of fixed-width temporal windows.

In various embodiments, the processing of the seismic data further comprises merging the first plurality of singular values, second plurality of singular values, and separate pluralities of singular values associated with each of the separate distinct pluralities of mutually time-shifted time-frequency samples and determining an appropriate fixed-width time window containing a maxima of the plurality of singular values associated with each of the three orthogonal axes, wherein the temporal location of the maxima indicate the appropriate time window to extract polarization information. In some embodiments, the processing of the seismic data further comprises processing a plurality of singular vectors associated with the appropriate fixed-width time window containing the maxima of the plurality of singular values and estimating an azimuth and a declination of a seismic source relative to the single triaxial geophone sensor. In various embodiments, the processing of the seismic data further comprises determining a first time onset of the linearly polarized p-wave, determining a second time onset of the s-wave, estimating a first local propagation speed of the linearly polarized p-wave, estimating a second local propagation speed of the s-wave, calculating a time difference of arrival of the p-wave and the s-wave, and estimating the location of a seismic source relative to the single triaxial geophone sensor.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
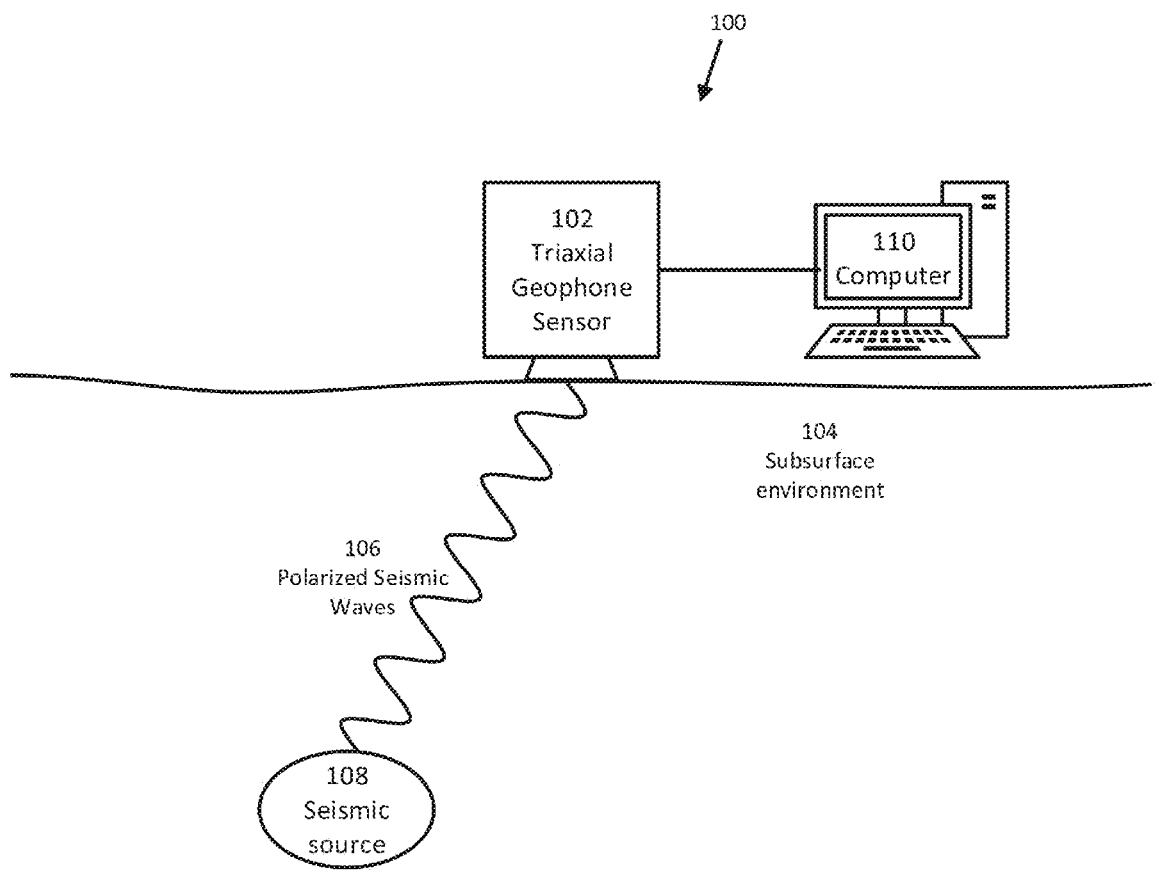
FIG. 1 is a block diagram illustrating an example configuration of a system for receiving seismic wave signals with a single triaxial geophone sensor and digitally processing the received signals.

Seismic energy produced by a subterranean source often propagates away from that source as a set of waves having differing polarizations. Examples of seismic waves can include linearly polarized pressure waves, also known as primary or P-waves, as well as shear waves, also known as secondary or S-waves, which can have an arbitrary polarization. Certain aspects and embodiments disclosed herein are directed to an apparatus and processes for measuring seismic wave energy signals using a single triaxial geophone sensor, as well as digitally processing the measured signals to identify and isolate the seismic waves of differing polarizations emanating from potentially multiple nearby sources within a time window of operation of the triaxial geophone sensor. As discussed in more detail below, through configuration of the triaxial geophone sensor, and an appropriate choice of digital signal processing techniques, a single sensor can be utilized to identify and locate nearby seismic sources even when the polarization waves received by the triaxial geophone sensor are received in close temporal proximity or have similar frequencies. Features of the detected and separated waves can then be used to estimate the range, bearing, and elevation to the seismic source.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Certain embodiments disclosed herein implement a seismic wave sensing and processing system using a single triaxial geophone sensor coupled to one or more digital signal processing systems, such as the computer system described below with respect to FIG. 19. According to these embodiments, a single triaxial geophone sensor includes capability for receiving and detecting seismic wave signals along three orthogonal axes during a defined temporal window producing three distinct time series of seismic wave data. In various embodiments, the triaxial geophone is capable of measuring seismic activity associate with seismic wave velocity, acceleration or ground displacement. The measured seismic data can be represented as $v_x(t)$, $v_y(t)$ and $v_z(t)$ for each of the three orthogonal directions, x, y and z, for which the triaxial geophone sensor measures seismic activity.

Referring to FIG. 1, a system 100 includes a single triaxial geophone sensor 102 that is coupled to the subsurface environment 104. In various embodiments, the single triaxial geophone sensor 102 is capable of detecting polarized seismic waves 106 produced by a seismic source 108. In some embodiments, the seismic source 108 can be a nearby subterranean source located within a subsurface environment 104 comprised of earth. In other embodiments, the seismic source 108 can be a source that is located above ground, but under a separate material, such as a snow pack present in the aftermath of an avalanche. In various embodiments, the velocity time series seismic wave signals detected by the triaxial geophone sensor 102 can be communicated to a computer system 110 where they can be digitally processed. The methods by which these velocity time series seismic wave signals can be digitally processed is described in more detail below.

Figure 2:
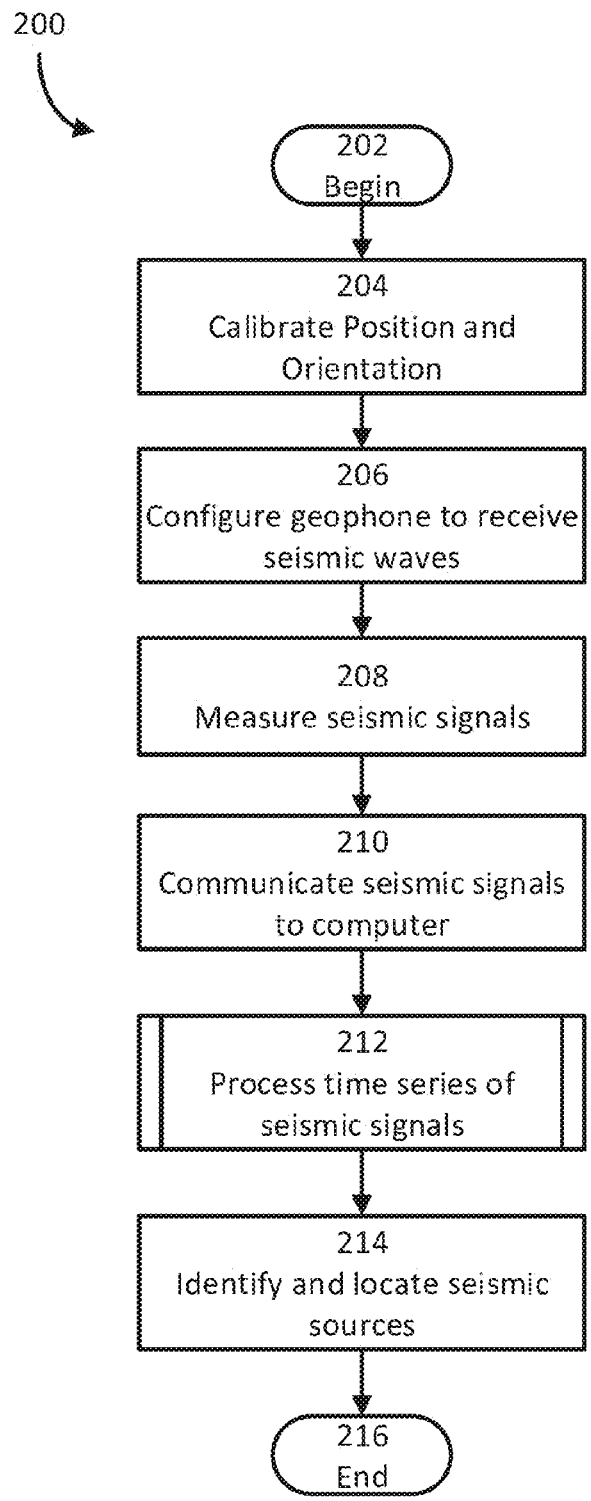
FIG. 2 is a flow diagram illustrating an example process for deploying and configuring a system used for detecting and processing seismic wave signals to identify a seismic source.

An example process 200 for the overall operation of the triaxial geophone sensor and computer system capable of digital signal processing is depicted in FIG. 2. The process 200 begins with act 202. In act 204, the position and orientation of the triaxial geophone sensor 102 are calibrated in relation to the subsurface environment 104. By orienting the triaxial geophone sensor appropriately, the three orthogonal axes of the sensor, x, y, and z may be associated with three orthogonal axes of the subsurface environment 104, often referred to as the northing, easting, and z directions. The northing and easting directions of the subsurface environment 104 may correspond to the north and east directions of the Earth, and the z direction of the subsurface environment can correspond to the depth direction of the subsurface environment 104. In act 206, the triaxial geophone sensor 102 may be configured to receive polarized seismic waves 106. In act 208, the triaxial geophone sensor may measure received seismic signals over a defined time window. In some embodiments, the time window over which received seismic signals are measured can be an open-ended, on-going measurement window. In various embodiments, the triaxial geophone sensor 102 can be an analog sensor that continuously measures any received seismic signals. In a preferred embodiment, the triaxial geophone sensor 102 is a digital sensor that samples the received seismic signal at a fixed sample rate. For example, the fixed sample rate of the seismic sensor may be 2-4 kHz. In various embodiments, the sample rate of the triaxial geophone sensor can be configured based on the properties of seismic signal expected to be received. In act 210, the triaxial geophone sensor 102 communicates the measured seismic signals to a computer system 110 where they can be stored either in temporary memory, such as RAM or flash memory, or written to more permanent storage, such as a hard disk drive. In act 212, the time series of seismic velocity data can be digitally transformed and processed by the computer system 110 to detect the onset of various seismic waves within the seismic wave velocity data and isolate signals for seismic waves of various polarizations within the data. The techniques used for transforming and processing the seismic velocity data are discussed in more detail below. In act 214, upon completing the transformation and processing of the seismic velocity data to identify the seismic waves of various polarizations within the time series data, the location and identity of various seismic sources within the received signals can be determined. Process 200 ends with act 216.

Figure 3:
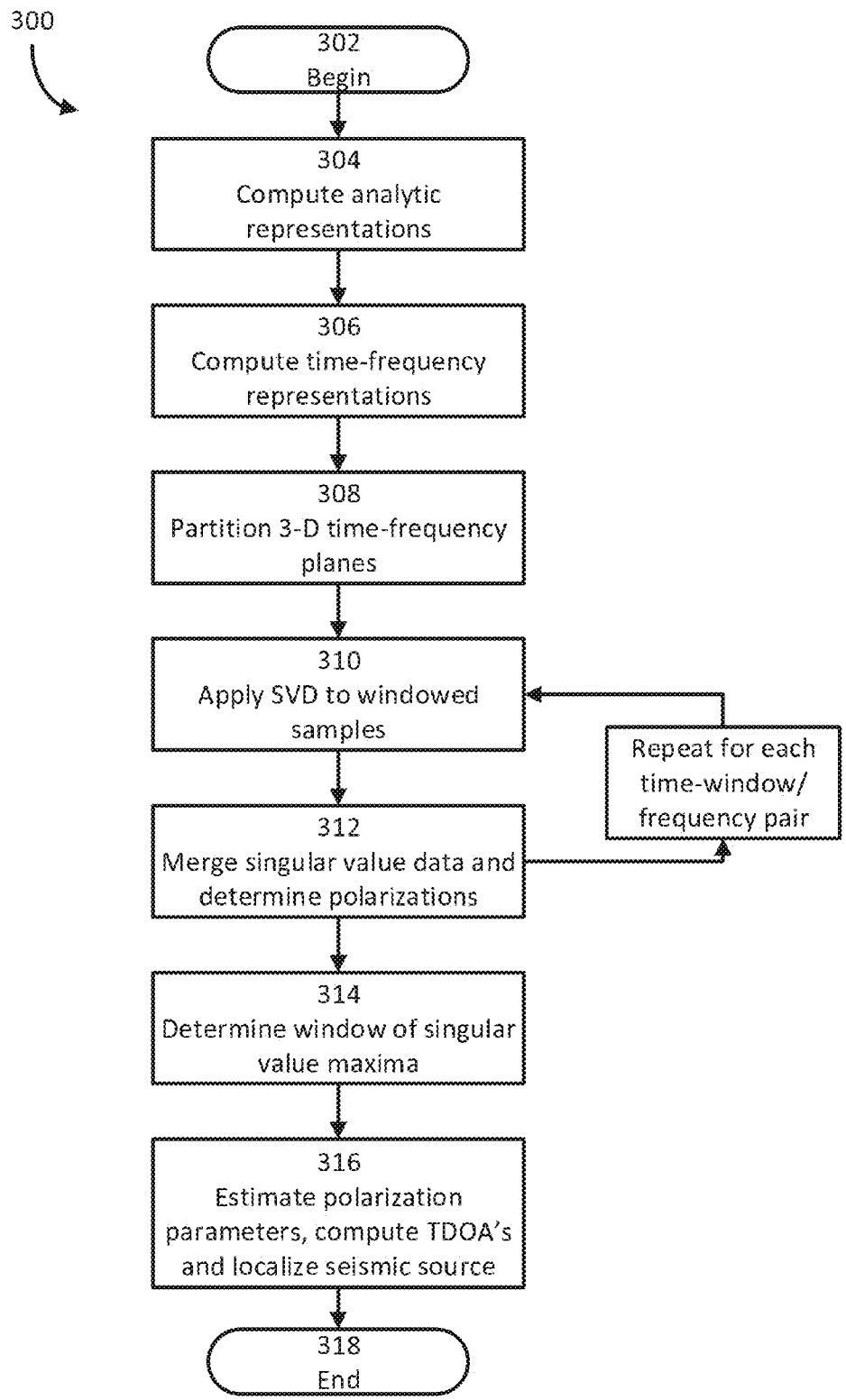
FIG. 3 illustrates an example process for processing time series seismic data.

As discussed above with regard to act 212 shown in FIG. 2, various embodiments provide methods for processing the time series of seismic velocity data received by the single triaxial geophone sensor 102 and stored on the computer system 110. FIG. 3 illustrates one such process 300 that includes acts of computing complex analytic representations of the set of time series of seismic velocity data, transforming the set of analytic time series of seismic velocity data into a set of time-frequency representations, sampling the set of time-frequency representations into smaller time windows, merging the samples of the set of time-frequency representations within unique time windows, performing singular value decomposition on the merged samples of time-frequency representations within unique time windows, merging the singular value data obtained from multiple time sample windows, determining the time-frequency window containing maxima of singular value data, and estimating properties of the polarized seismic waves to use in locating the source of the seismic waves. Process 300 begins with act 302. In act 304, the sampled time series of seismic velocity data received by the triaxial geophone sensor 102 are transformed into corresponding complex, analytic representations. In some embodiments, a Hilbert transformation, a well-known mathematical transformation used in field of signal processing, is used to create the complex, analytic representations of the time series of seismic velocity data from the initial real-valued time series signals. No assumption regarding the presence or non-presence of a seismic wave is necessary when performing this complex, analytic transformation, as the data processing performed in subsequent steps are used to detect the presence of polarized seismic waves from a nearby source. The complex, analytic representation of the seismic velocity data can be represented as in the following set of expressions for each of the three orthogonal axes:

$$v_{x,a}(t) = v_x(t) + iH(v_x(t)) \quad (1)$$

$$v_{y,a}(t) = v_y(t) + iH(v_y(t)) \quad (2)$$

$$v_{z,a}(t) = v_z(t) + iH(v_z(t)) \quad (3)$$

where $H(h(t))$ is the Hilbert transformation of the time series function $h(t)$. By representing the real time series data in a complex, analytic form, the polarization of an embedded wave can be measured from any point in the recorded seismograms, whereas directly using the real time-series signals would require an average value to be determined over a portion of a wavelength.

In act 306, the complex, analytic representations of the time series of velocity data are transformed into corresponding time-frequency representations. A time-frequency representation of the seismic velocity data describes the measured velocity signals as two dimensional functions of time and frequency, and allows for direct observation of the onset time of seismic waves of differing frequencies, even when those frequencies overlap in time. In some embodiments, the act of transforming the complex, analytic seismic velocity data into a corresponding time-frequency representation is performed through the use of an S-transform, as known as a Stockwell transform. The S-transform is a known transformation technique utilized within the geophysical signal processing community, which can be derived as an altered form of the short-time Fourier transformation (STFT). The STFT can be represented as follows:

$$\text{STFT}(\tau, f) = \int_{-\infty}^{\infty} h(t) g(\tau - t) e^{-j2\pi ft} dt. \quad (4)$$

where $\tau$ and $f$ represent the time of spectral localization and Fourier frequency, respectively, and $g(t)$ represents a windowing function. The S-transformation can be derived from the STFT by replacing the window function $g(t)$ with a Gaussian function as follows:

$$g(t) = \frac{|f|}{\sqrt{2\pi}} e^{-\frac{t^2 f^2}{2}}. \quad (5)$$

Incorporating this Gaussian window function, the S-transform can then be defined as follows:

$$S(\tau, f) = \int_{-\infty}^{\infty} h(t) \frac{|f|}{\sqrt{2\pi}} e^{-\frac{(\tau - t)^2 f^2}{2}} e^{-j2\pi ft} dt. \quad (6)$$

For implementation on a computer system, such as computer system 110, a discretized version of the S-transform can be utilized.

When utilizing an S-transform to create a time-frequency representation of the complex analytic seismic velocity data the created representation can maintain globally referenced phase information of the seismic waves, as opposed to more traditional continuous wavelet transform (CWT) methods that only maintain phase information locally. The ability to maintain global, absolute phase reference information within the time-frequency representation can be very important for performing accurate pointing direction estimation to the source.

In act 308, the time-frequency representations of seismic velocity data for the three orthogonal directions are partitioned into discrete windowed time slices. In some embodiments, the size of the window, $t_{window}$, may be on the order of 5 samples for samples rates less than 2 kHz. The use of such small time windows is feasible for later processing steps due to the global, absolute phase referencing inherent in the S-transform of the complex, analytic time series.

In act 310, the samples of a particular sample time window and frequency value of the time-frequency representation for the time series of the three orthogonal directions are merged into a single matrix, M, of size (3 rows by size($t_{window}$) columns). Each row of M corresponds to the x, y, and z slices of the appropriately indexed time-frequency plane. Once the merged matrix, M, is created for a particular time window slice and frequency value, the singular value decomposition of M is calculated, yielding three singular values and corresponding complex singular vectors. The singular values, $\sigma_1 \leq \sigma_2 \leq \sigma_3$, represent the lengths of a polarization ellipsoid describing the overall seismic wave polarization and corresponding complex singular vectors, $\Sigma_1, \Sigma_2, \Sigma_3$, represent the orientation of the polarization ellipsoid. These singular values and singular vectors can be utilized at a later step to identify the time onset and location of a seismic wave source. The calculation of these singular values and singular vectors are repeated for each time-window and frequency combination of the time-frequency representation.

In act 312, the singular value data, and singular vector data can be merged for each of the ordered singular values and corresponding singular vectors across all of the time-window and frequency samples. Upon merging the singular value and singular vector data, the singular values can be then be used in calculating a signal-to-noise ratio to determine the presence of a relevant seismic source signal, and also the extent of signal polarization. In some embodiments, for nearby, underground seismic sources, isolation of the p-wave at each time-window and frequency combination can be determined by calculating the signal-to-noise ratio against a threshold value as follows:

$$SNR = \left| \left(1 - \left(\frac{\sigma_3}{\sigma_1}\right)^2\right)(\sigma_1 - \sigma_2) \right| > \text{Threshold} \quad (7)$$

In some embodiments, the second singular value, $\tau_2$, is also utilized to determine whether or not a following s-wave is present at the current time-window and frequency location. Acts 310 to 312 are repeated for each time-window sample and frequency combination pair within the time-frequency representation created in Act 308.

In act 314, the time-frequency locations of the singular values that exceed a pre-defined threshold are examined to determine the time-frequency location of the singular value maxima. These maxima locations determine the singular values and singular vectors to be utilized in the following step to estimate relevant properties of the seismic source.

In act 316, the singular values and singular vectors associated with the previously determined maxima singular values are processed to estimate various polarization parameters, such as the linearity or ellipticity of the different seismic waves, the time difference of arrival between various seismic waves, and seismic source localization properties, such as the azimuth and declination of the source of p-waves with respect to the triaxial geophone sensor orientation.

As described in the paper "Complex Polarization Analysis of Particle Motion" by John E. Vidale, (which utilizes eigenvalue decomposition and analysis instead of singular value decomposition and analysis, but whose treatment of eigenvalues is otherwise relevant to the usage of singular values discussed below and is hereby incorporated by reference in its entirety), in some embodiments, a singular vector (x0, y0, z0) associated with the largest singular value, can be used to determine the degree of ellipticity of the seismic wave. The singular vector can be normalized to have a length of 1, and then by rotating this singular vector from 0° to 180° in the complex plane, the rotation that results in the largest real component can be determined. The length of the real component of the singular vector can be expressed as follows:

$$X = \sqrt{(\text{Re}(x_0 cis\, \alpha))^2 + (\text{Re}(y_0 cis\, \alpha))^2 + (\text{Re}(z_0 cis\, \alpha))^2} \quad (8)$$

where cis $\alpha$=cos $\alpha$+i sin $\alpha$, Re(x) is the real part of x, and i=$\sqrt{-1}$. Upon rotating the singular vector (x0, y0, z0) by an angle $\alpha$, the elliptical component of polarization can be estimated by the following expression:

$$P_E = \frac{\sqrt{1-X^2}}{X} \quad (9)$$

As the singular vector is normalized, $\sqrt{1-X^2}$ is the length of the complex part of the singular vector, and $P_E$ is the ratio of the imaginary part of the singular vector to the eigenvector. $P_E$ has a value of 1 for circularly polarized motion and has a value of 0 for linearly polarized motion. The direction of maximum polarization can be determined as $$\varphi = \tan^{-1}\left(\frac{\text{Re}(y_0)}{\text{Re}(x_0)}\right). \quad (10)$$

The declination in the direction of maximum polarization can be determined as $$\varphi = \tan^{-1}\left(\frac{\text{Re}(z_0)}{\sqrt{\text{Re}(x_0)^2 + \text{Re}(y_0)^2}}\right). \quad (11)$$

The singular vectors associated with the intermediate singular value, $\sigma_2$, and smallest singular value, $\sigma_1$, point in the directions of the intermediate and least amount of polarization, respectively. A measure of the strength of the polarization of the signal received can be expressed as follows:

$$P_S = 1 - \frac{\sigma_1 + \sigma_2}{\sigma_3} \quad (12)$$

where $P_S$ is close to 1 if the signal is completely polarized with only one primary component of polarization, but $P_S$ is close to 0 if the largest component of polarization is only as large as the sum of the remaining two components. A measure of the degree of planar polarization can also be expressed as follows:

$$P_P = 1 - \frac{\sigma_1}{\sigma_2} \quad (13)$$

where $P_p$ is close to 1 if the intermediate component of the polarization is much larger than the smallest component, but $P_p$ is close to 0 if the intermediate and smallest components are comparable.

Having calculated the desired polarization parameters and source location information related to the detected seismic waves, process 300 ends with act 318.

Figure 4:
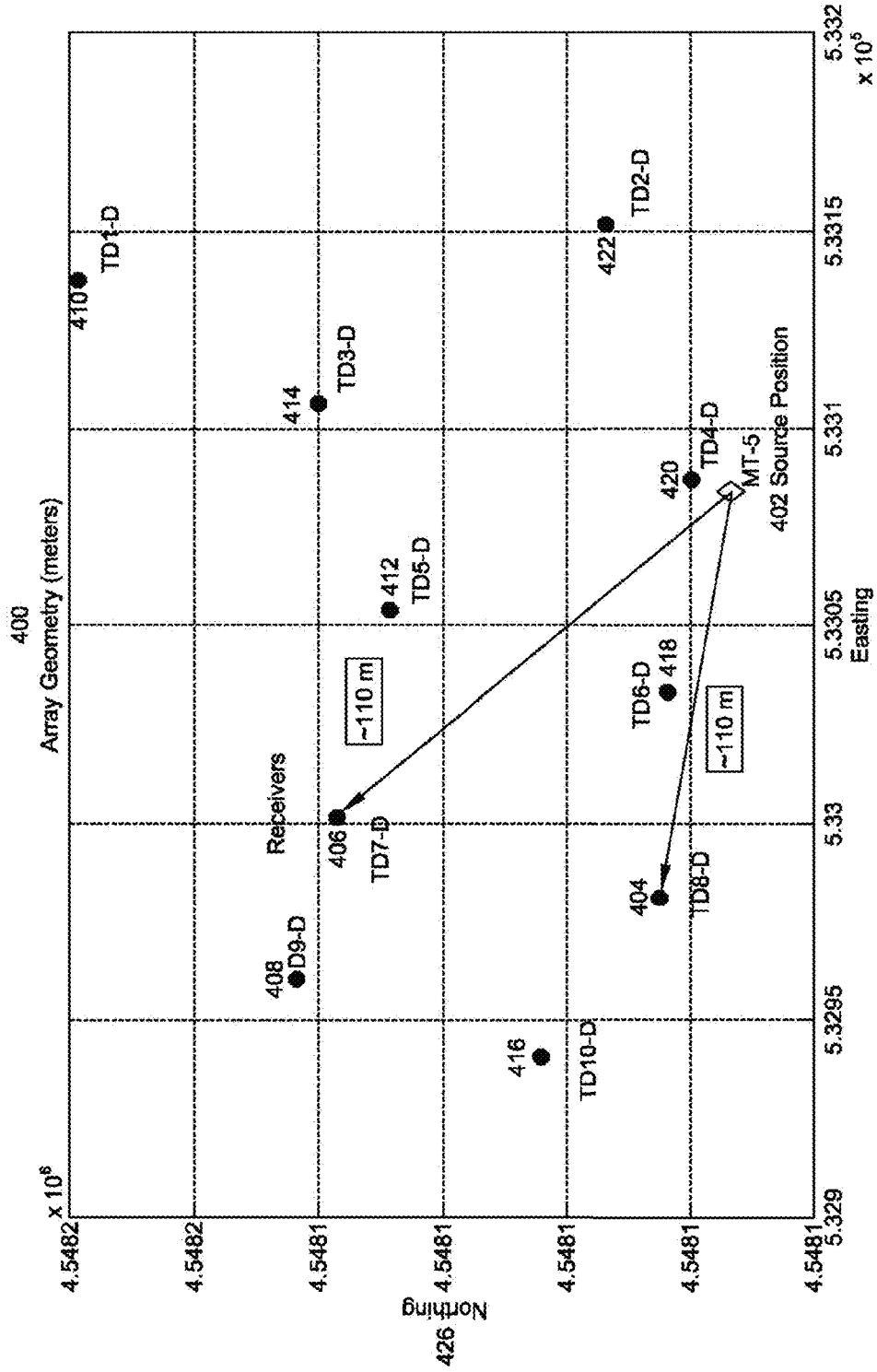
FIG. 4 illustrates an example geographic distribution of a seismic source and distinct single triaxial geophone sensors.

The following examples illustrate application of the above-described processes and methods to some exemplary data sets that were measured experimentally. An example environment 400 in which seismic velocity data was collected is depicted in FIG. 4. A source position 402 is mapped in relation to a number of triaxial geophone sensors 404-422, including sensors 404 and 406 corresponding to the data shown in FIG. 5—FIG. 18 described below. The location of the source and the sensors are plotted on axes 424 and 426 on a scale of roughly 50 meters between grid lines. In the example shown in FIG. 4, the distance between the source position 402 and the two triaxial geophone sensors 404 and 406 is approximately 110 meters. In this example, the axes 424 and 426 correspond to the easting and northing directions respectively.

Figure 5:
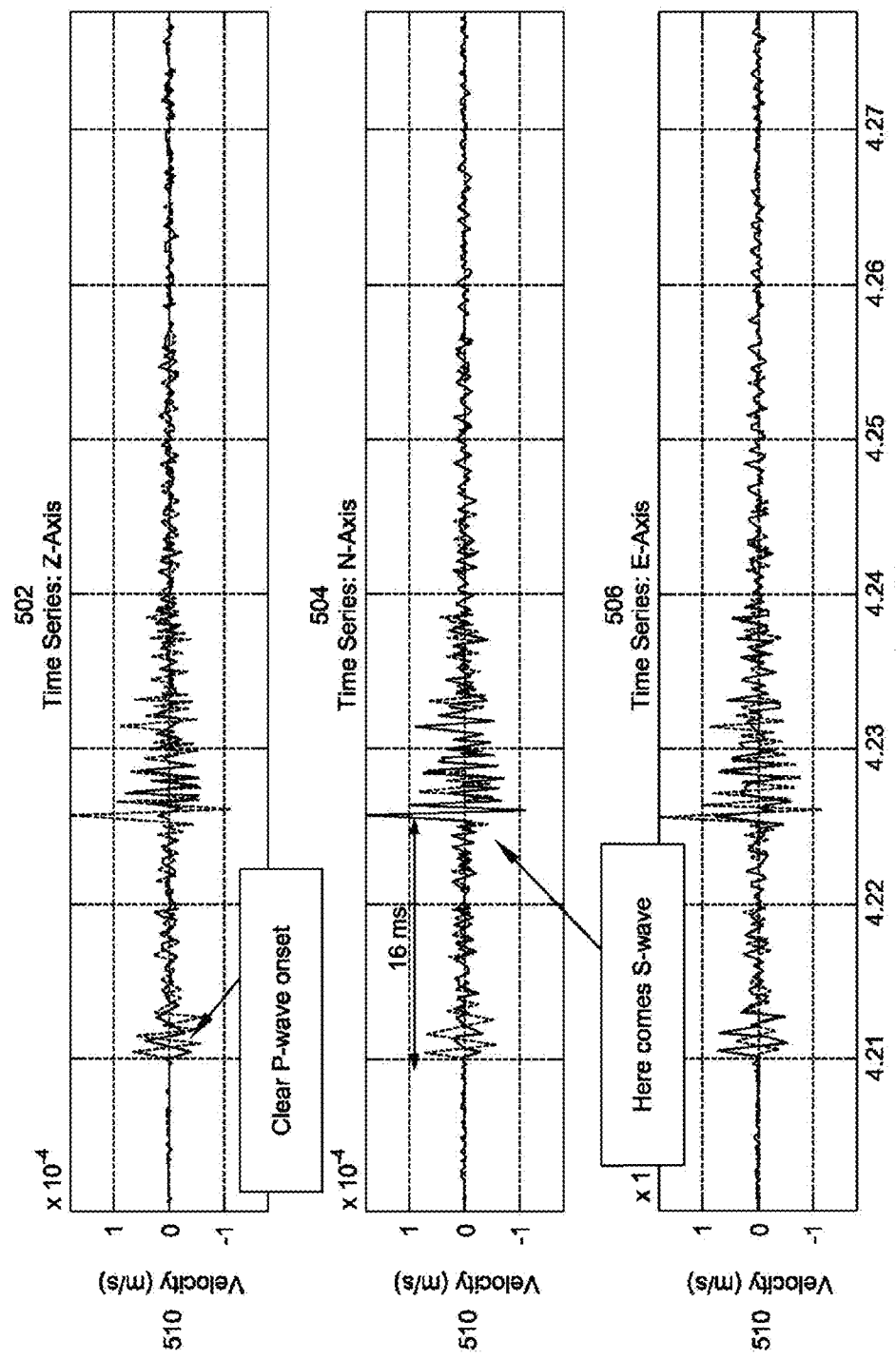
FIG. 5 illustrates an example set of seismic signal time series data received along three orthogonal axes of a single triaxial geophone.

FIG. 5 depicts an example set of time series seismic velocity data measurements 502, 504, and 506 captured at sensor 404 along each of the z, northing, and easting directions respectively. The set of time series are plotted such that time 508 is on the horizontal axis and velocity 510 is on the vertical axis for each time series plot. Upon observe the z-direction plot 502, in relation to the northing plot 504 and easting plot 506, an onset of a P-wave can be seen to occur 16 milliseconds prior to the arrival of an S-wave.

Figure 6:
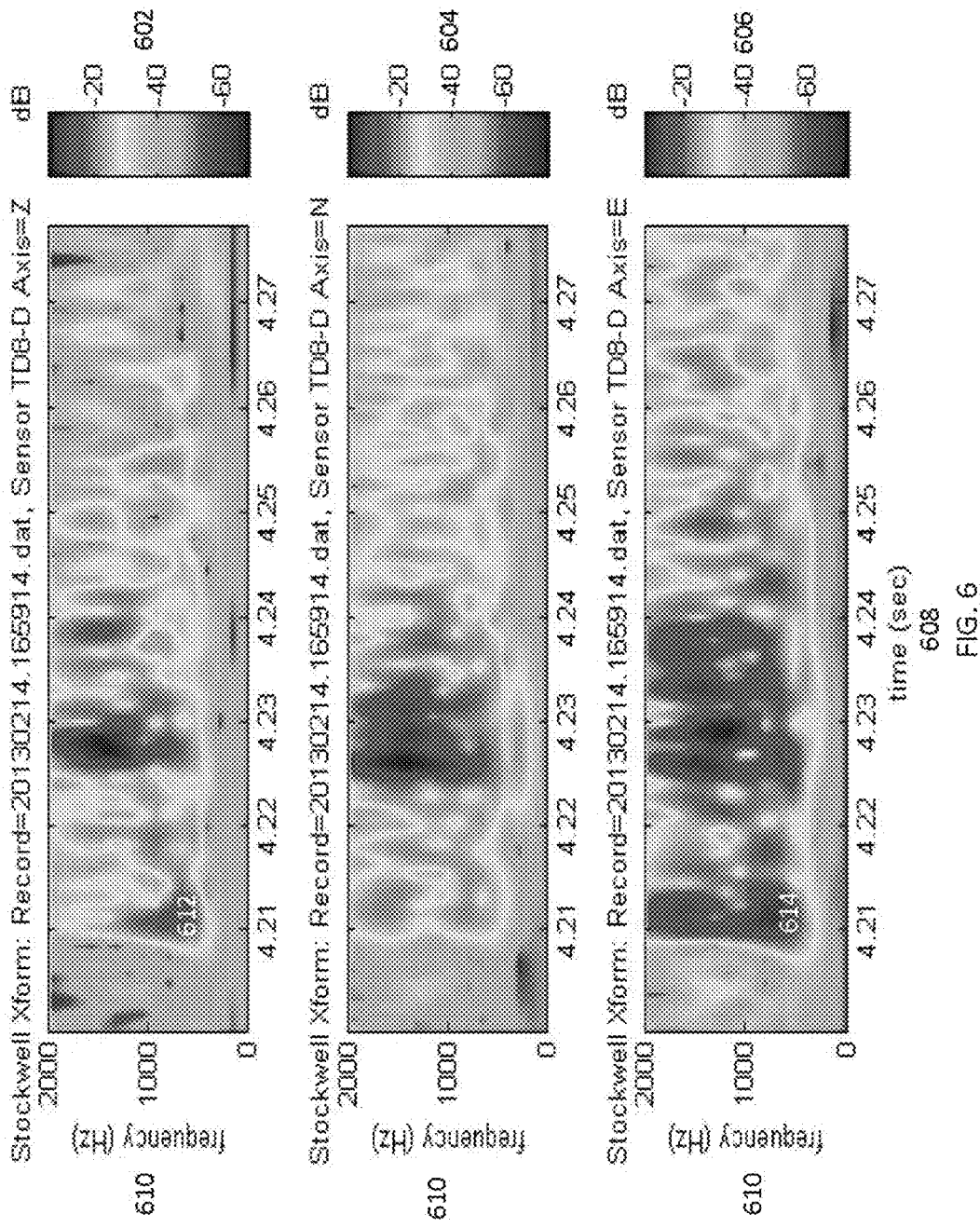
FIG. 6 illustrates an example set of seismic signal time series data transformed into time-frequency representations.

FIG. 6 depicts an example of the corresponding time-frequency representations 602, 604 and 606 for each of the time-series seismic velocity data of z, northing and easting directions shown in FIG. 5. The set of time-frequency representations are plotted such that time 608 is on the horizontal axis and frequency 610 is on the vertical axis for each time-frequency plot. For the example seismic velocity data represented in FIG. 5, the time-frequency plots in FIG. 6 show that energy associated with a detected P-wave is mostly along the z and easting axes, as can be deduced from locations 612 and 614, while a detected S-wave is fully elliptic having energy present in all three plots.

Figure 7:
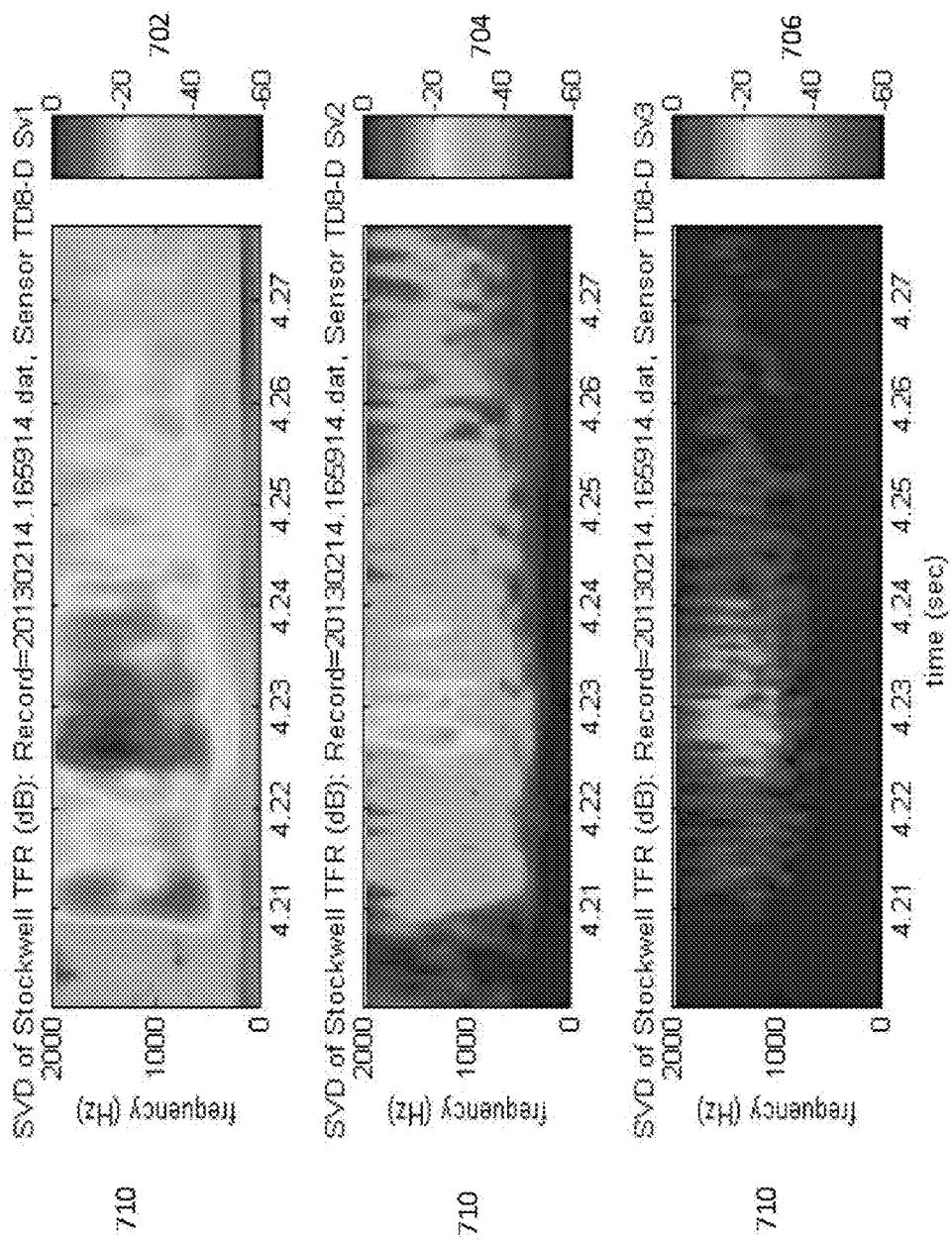
FIG. 7 illustrates an example set of singular value data extracted from a corresponding set of time-frequency representations of seismic signal data.

FIG. 7 depicts an example of time-frequency representations 702, 704, and 706 for the corresponding singular values $\sigma_1 \le \sigma_2 \le \sigma_3$ respectively. The set of time-frequency representations are plotted such that time 708 is on the horizontal axis and frequency 710 is on the vertical axis for each time-frequency plot. The data associated with each of the singular values for the set of time-frequency representations show that the energy associated with the detected P-wave is strongly rectilinear, while the energy associated with the S-wave is elliptical. As can be seen in plot 706, the noise level associated with the smallest singular value is very low.

Figure 8:
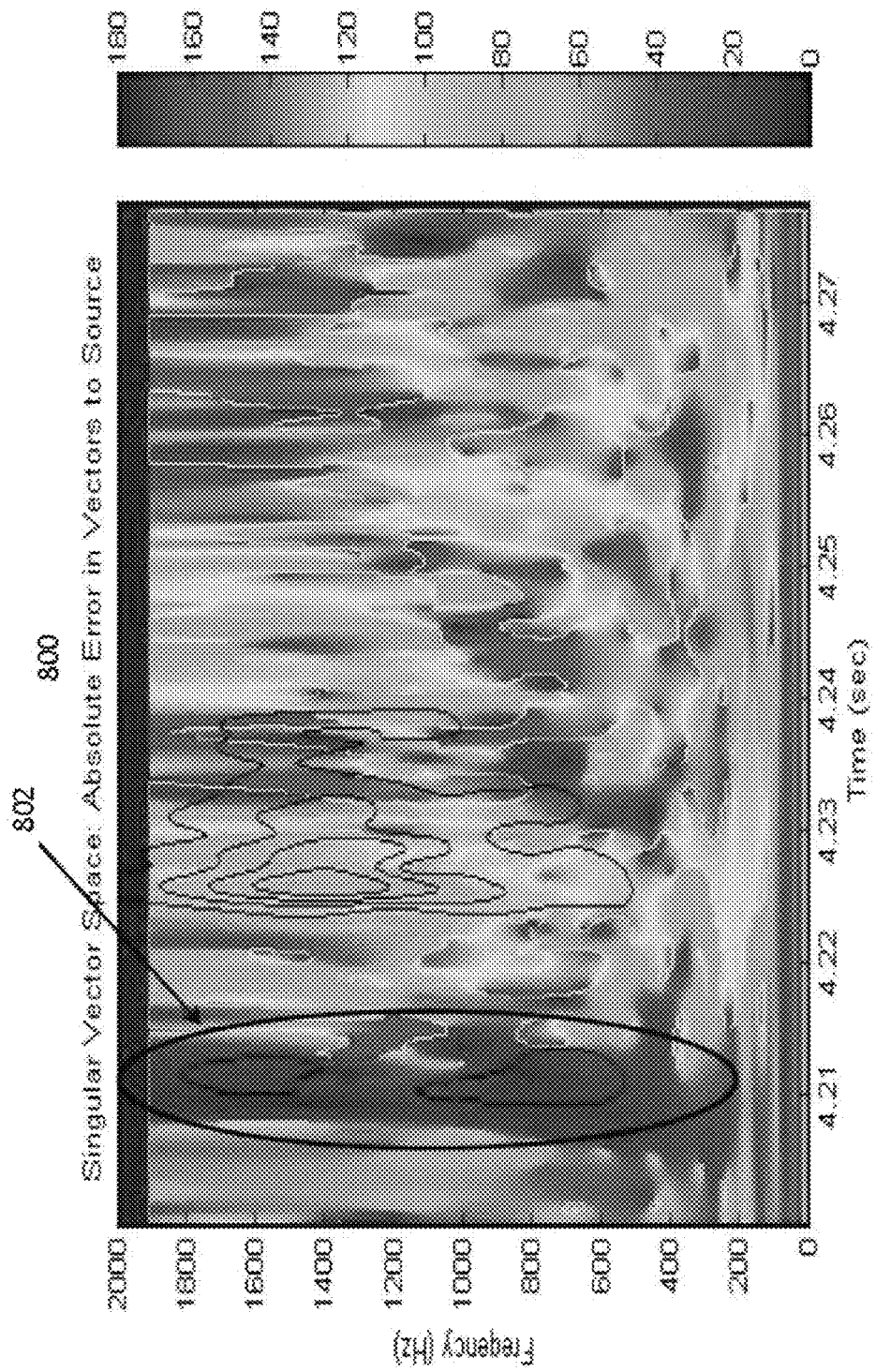
FIG. 8 illustrates an example singular vector space extracted from a corresponding set of time-frequency representations of seismic signal data.

FIG. 8 depicts an example of a time-frequency representation 800 of absolute error in calculating pointing vector relative to the source location. In this particular example, the pointing vector values (source location and direction) are calculated using methods described previously with respect to act 316. The absolute error of the pointing vector calculations is included in this plot, because the location of the source was known a priori. As shown in region 802, there is very little error in the regions where the P-wave onset occurred.

Figure 9:
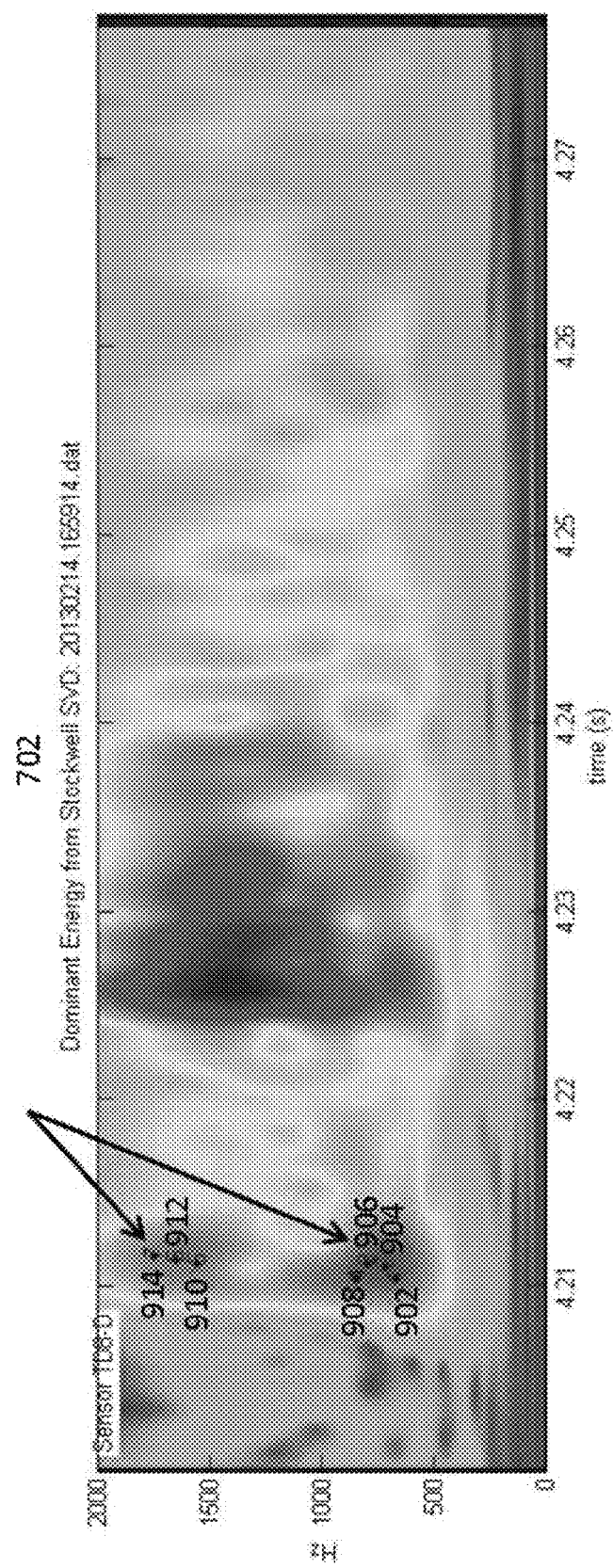
FIG. 9 illustrates an example set of singular value data extracted from a corresponding set of time-frequency representations of seismic signal data.
Figure 10:
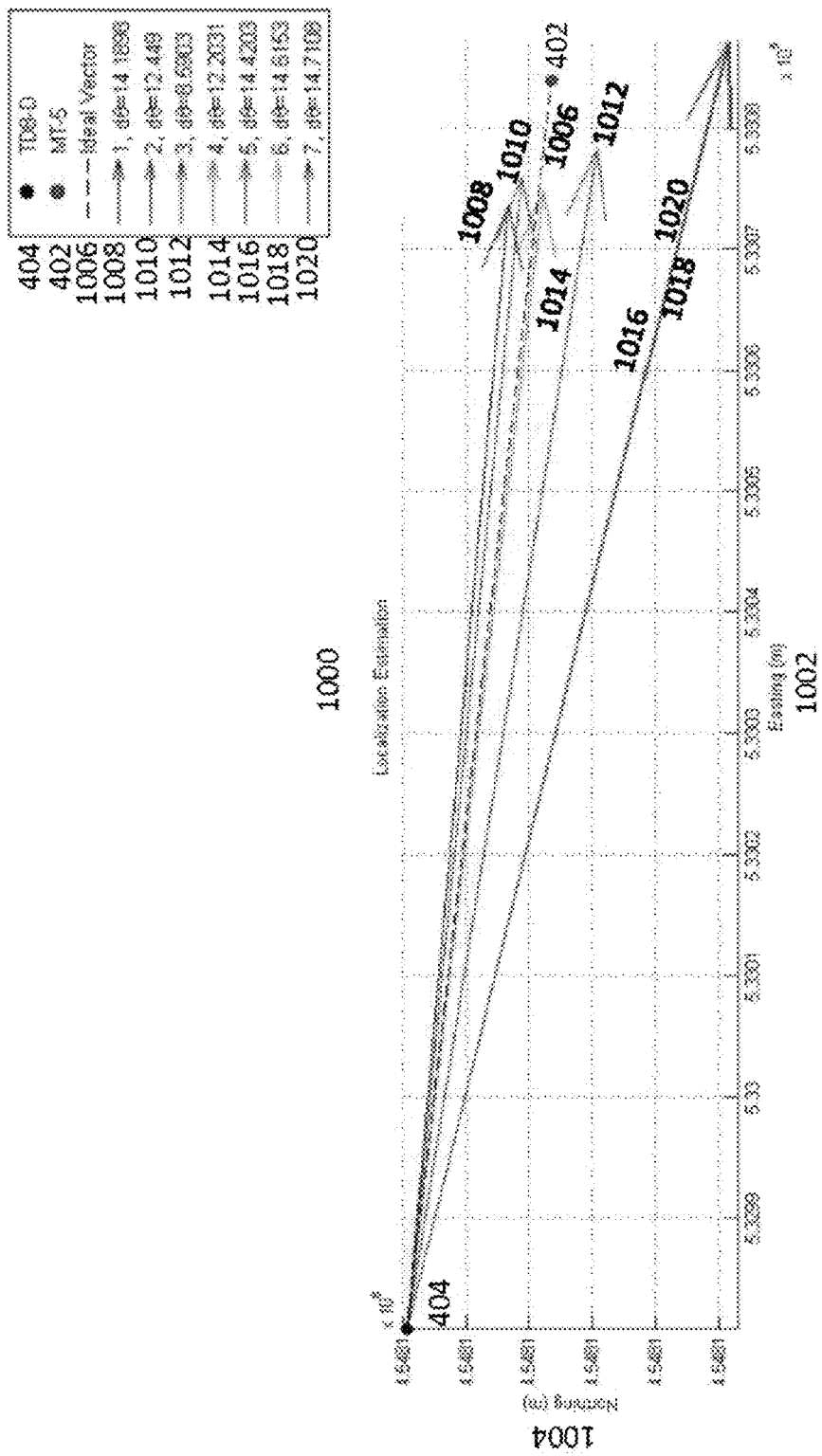
FIG. 10 illustrates an example graph of bearing localization estimations based on singular value data extracted from a corresponding set of time-frequency representations of seismic signal data.

FIG. 9 is a depiction of the time-frequency representations of the same primary singular value data 702 shown in FIG. 7, but highlights regions 902-914 representing maxima of singular values associated with dominant P-wave energy zones. FIG. 10 represents a map 1000 of both an ideal azimuth localization vector 1006 between source location 402 and sensor 404, as well as estimated azimuth localization vectors 1008-1020 associated with the singular value maxima 902-914 respectively. In this example, the axes 1002 and 1004 correspond to the easting and northing directions respectively.

Figure 11:
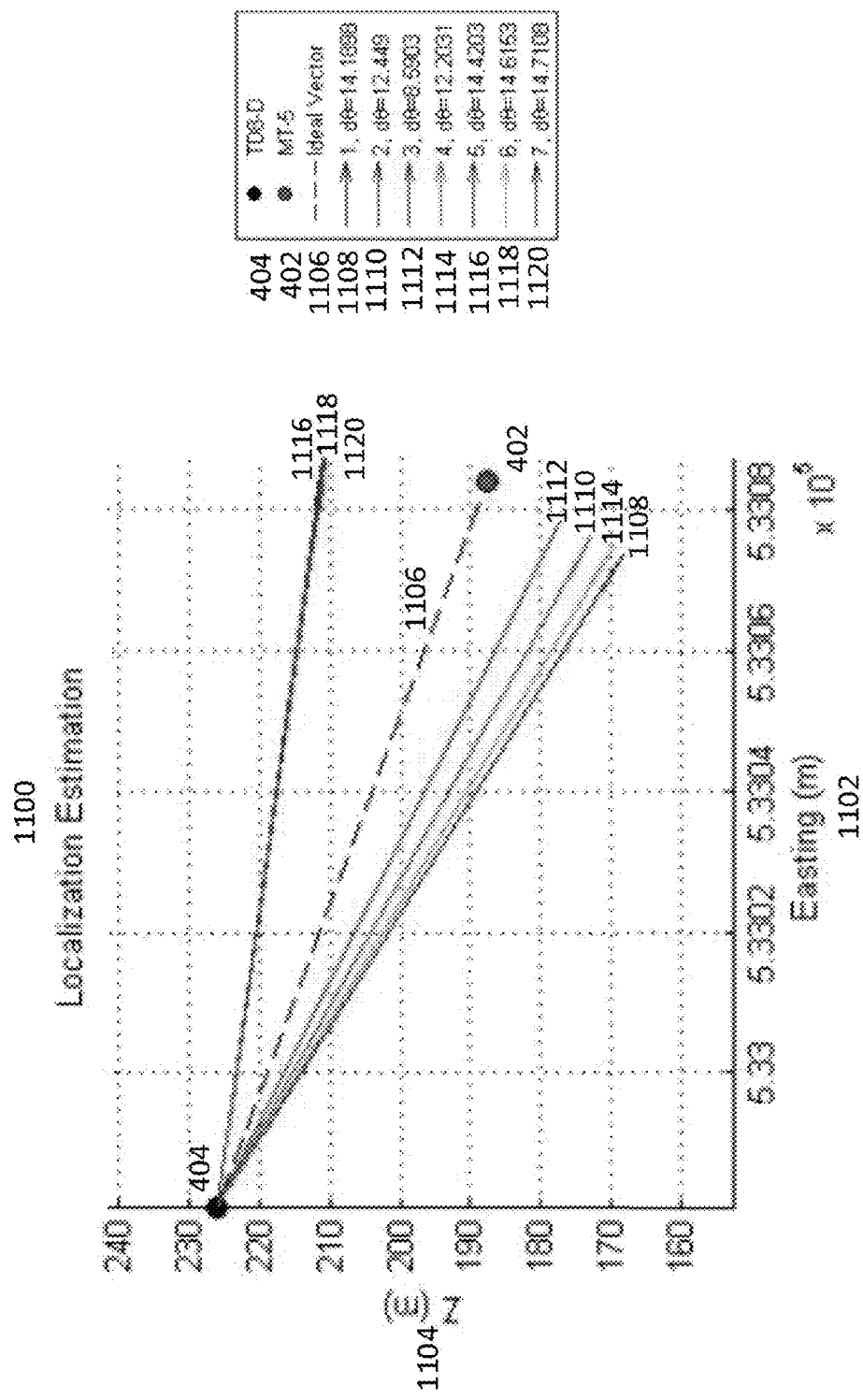
FIG. 11 illustrates an example graph of dip estimations based on singular value data extracted from a corresponding set of time-frequency representations of seismic signal data.

Similarly, FIG. 11 represents a map 1100 of both an ideal declination localization vector 1106 between source 402 and sensor 404, as well as estimated declination localization vectors 1108-1120 associated with the singular value maxima 902-914 respectively. In this example, the axes 1102 and 1104 correspond to the easting and z directions respectively.

Figure 12:
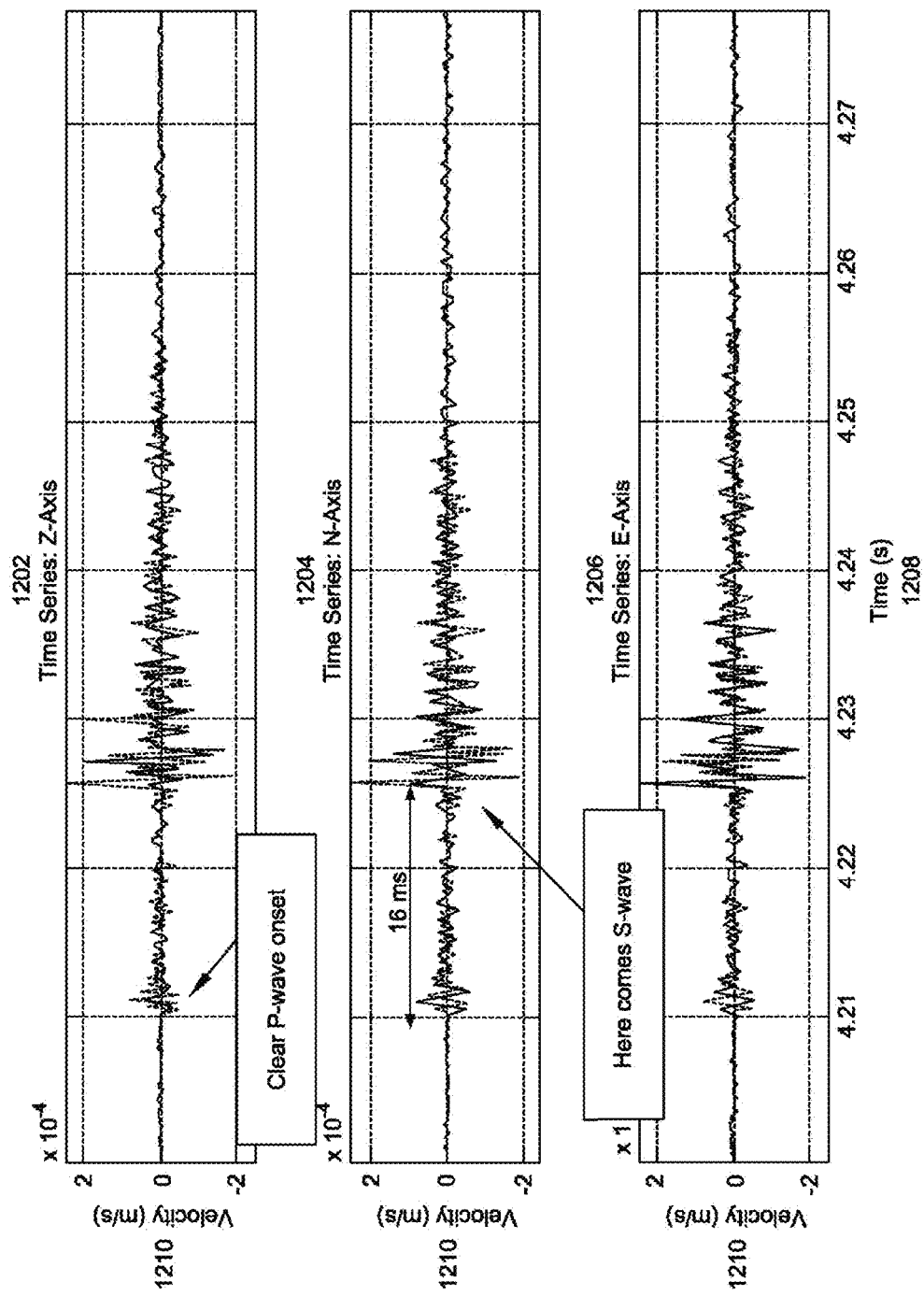
FIG. 12 illustrates another example set of seismic signal time series data received along three orthogonal axes of a single triaxial geophone.

FIG. 12 is a depiction of time series of seismic velocity data similar to FIG. 5, but associated with data received at sensor 406. FIG. 12 depicts an example set of time series seismic velocity data measurements 1202, 1204, and 1206 captured at sensor 406 along each of the z, northing, and easting directions respectively. The set of time series are plotted such that time 1208 is on the horizontal axis and velocity 1210 is on the vertical axis for each time series plot. Upon observing the z-direction plot 1202, in relation to the northing plot 1204 and easting plot 1206, an onset of a P-wave can be once again be seen to occur 16 milliseconds prior to the arrival of an S-wave.

Figure 13:
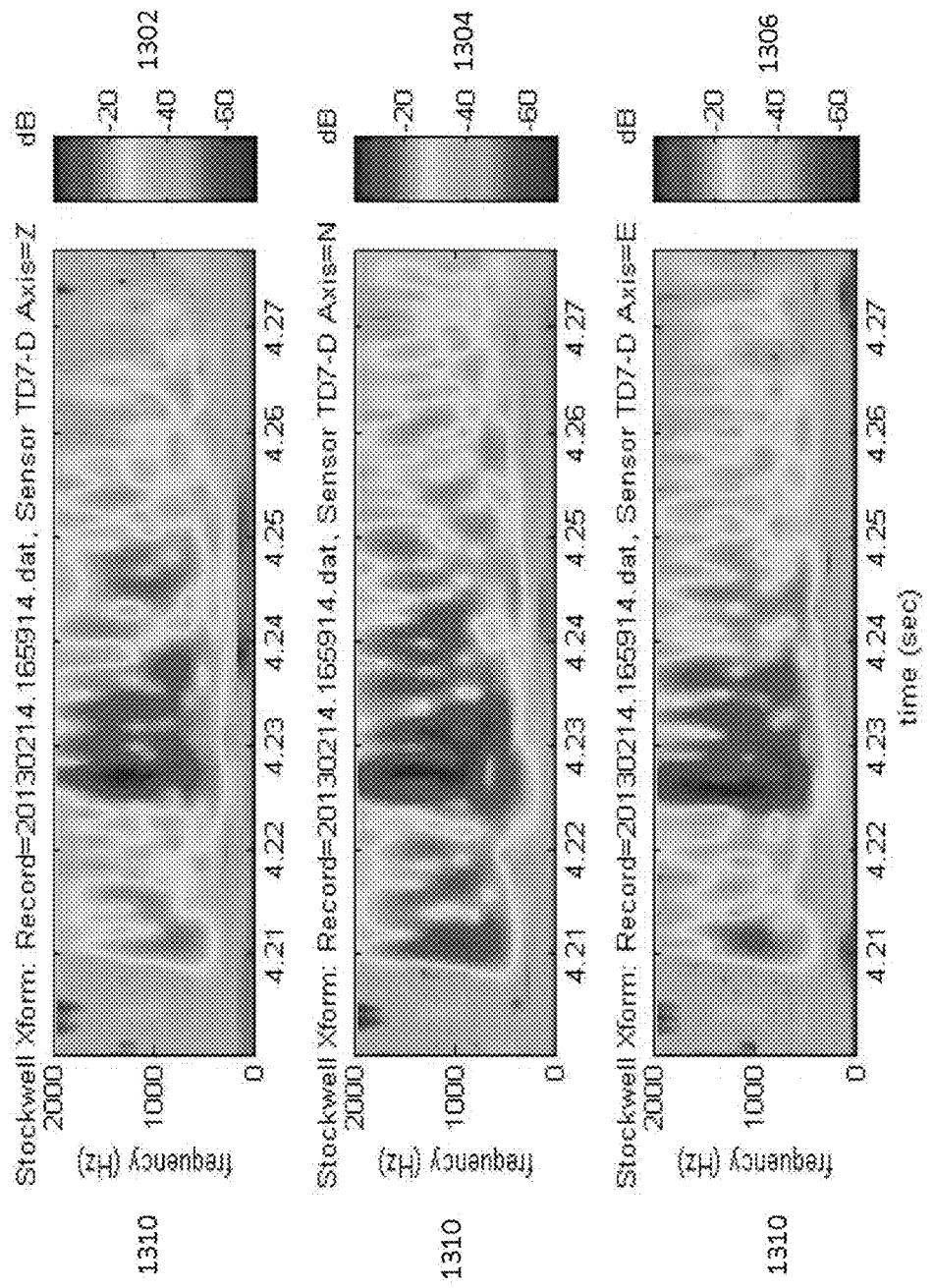
FIG. 13 illustrates another example set of seismic signal time series data transformed into time-frequency representations.

FIG. 13 depicts an example of the corresponding time-frequency representations 1302, 1304 and 1306 for each of the time-series seismic velocity data of z, northing and easting directions shown in FIG. 12. The set of time-frequency representations are plotted such that time 1308 is on the horizontal axis and frequency 1310 is on the vertical axis for each time-frequency plot. For the example seismic velocity data represented in FIG. 12, the time-frequency plots in FIG. 13 show that energy associated with a detected P-wave is mostly along the northing axis, as can be deduced from locations 1312, while a detected S-wave is fully elliptic having energy present in all three plots.

Figure 14:
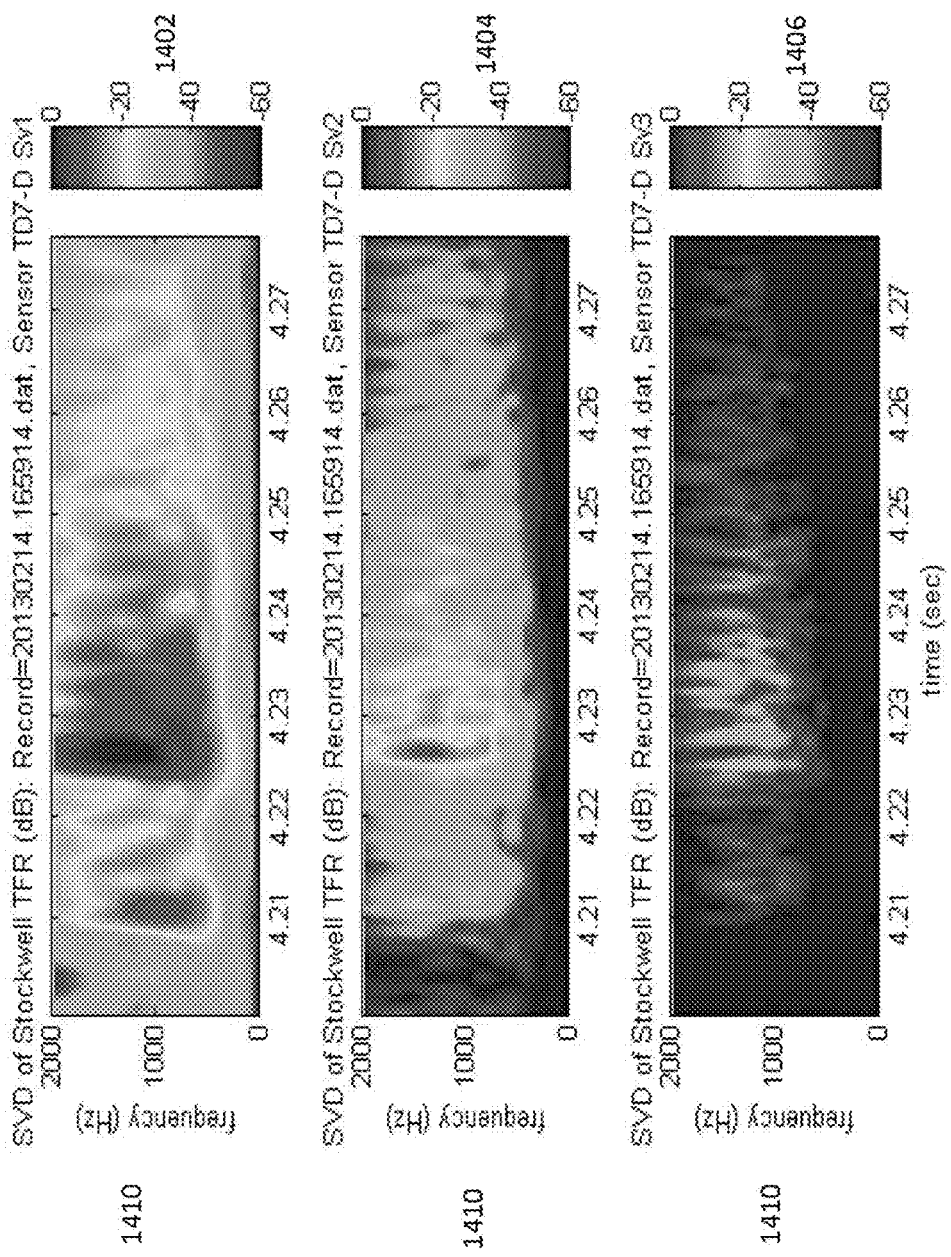
FIG. 14 illustrates another example set of singular value data extracted from a corresponding set of time-frequency representations of seismic signal data.

FIG. 14 depicts another example of time-frequency representations 1402, 1404, and 1406 for the corresponding singular values $\sigma_1 \le \sigma_2 < \sigma_3$ respectively. The set of time-frequency representations are plotted such that time 1408 is on the horizontal axis and frequency 1410 is on the vertical axis for each time-frequency plot. The data associated with each of the singular values for the set of time-frequency representations show that the energy associated with the detected P-wave is strongly rectilinear, while the energy associated with the S-wave is elliptical. As with FIG. 7, the noise level associated with the smallest singular value plot 1406 is low, but is louder than the noise level shown in plot 706.

Figure 15:
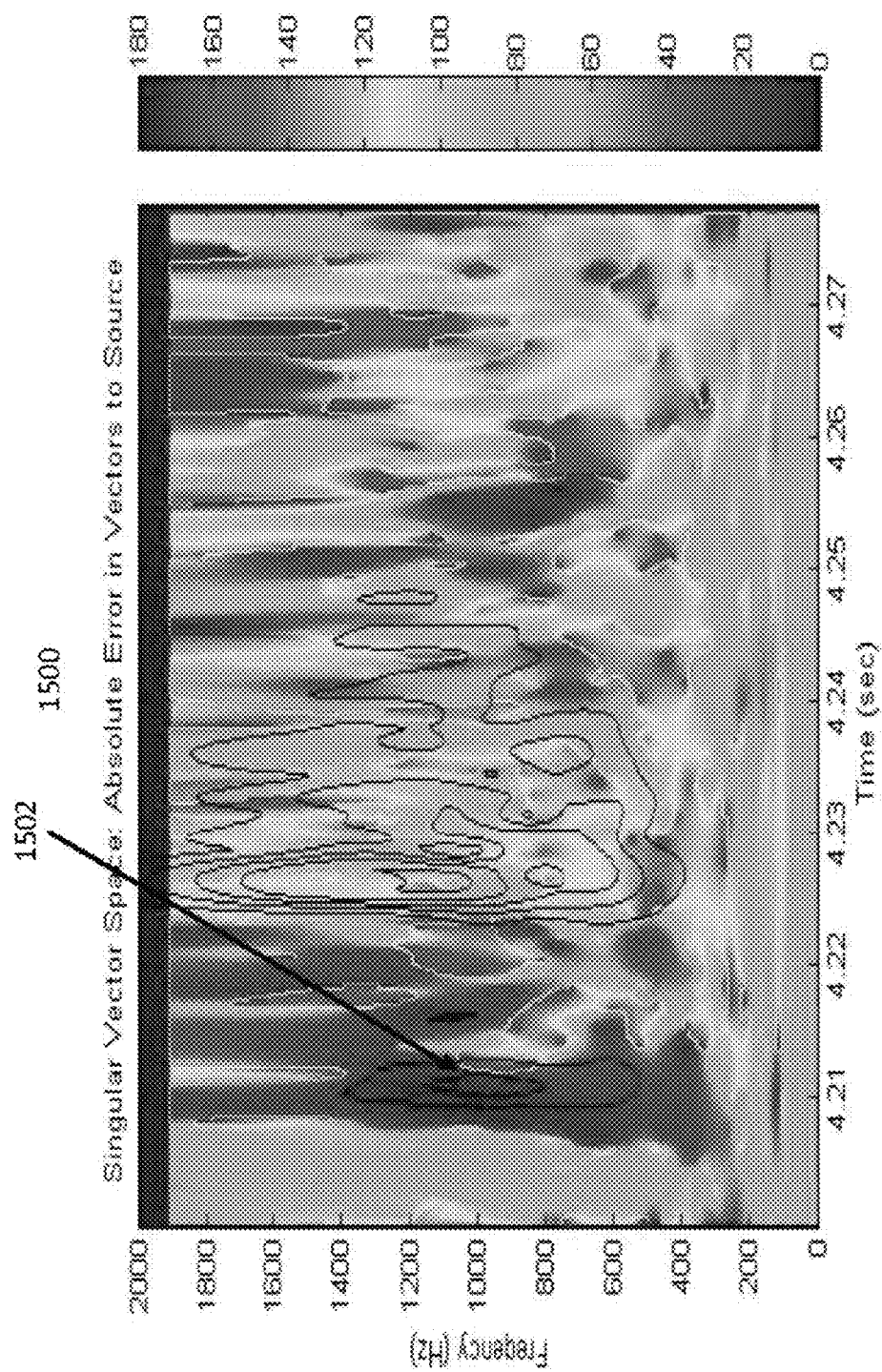
FIG. 15 illustrates an example set of absolute error in vectors to source of a singular vector space extracted from a corresponding set of time-frequency representations of seismic signal data.

FIG. 15 depicts an example of a time-frequency representation 800 of absolute error in calculating pointing vector relative to the source location. In this particular example, the pointing vector values (source location and direction) were calculated using methods described previously with respect to act 316. The absolute error of the pointing vector calculations can depicted in this plot, because the location of the source was known a priori. As shown in region 1502, and similar to region 802, there is very little error in the regions where the P-wave onset occurred.

Figure 16:
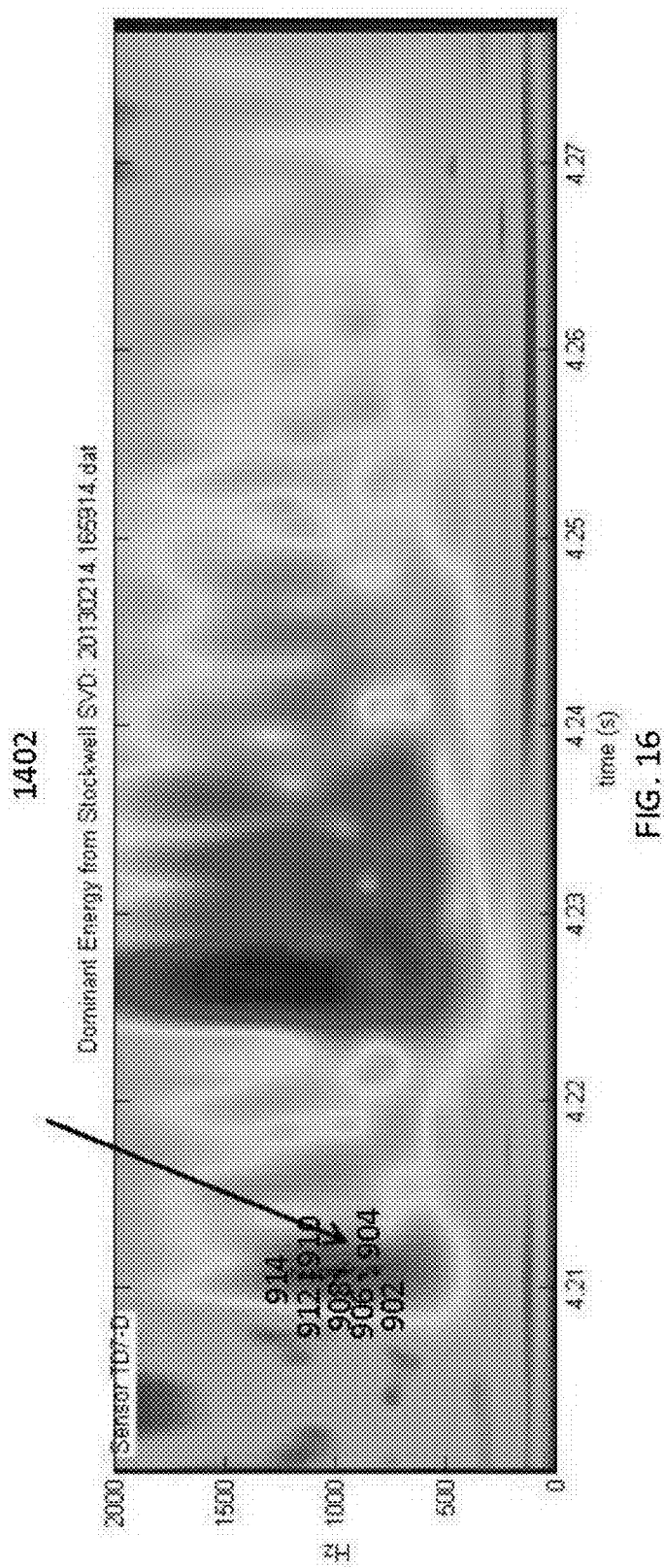
FIG. 16 illustrates another example set of singular value data extracted from a corresponding set of time-frequency representations of seismic signal data.
Figure 17:
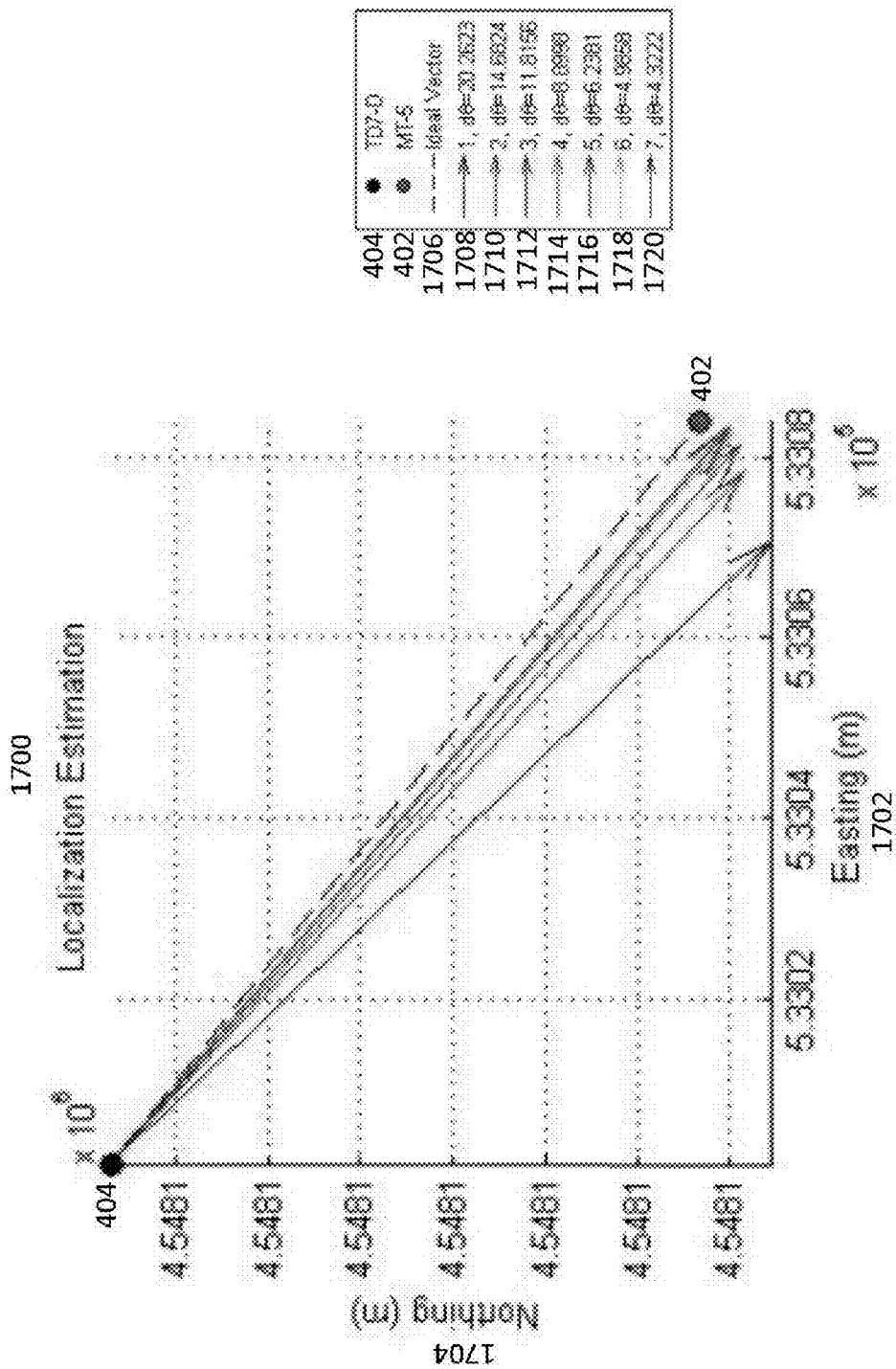
FIG. 17 illustrates another example graph of localization estimations based on singular value data extracted from a corresponding set of time-frequency representations of seismic signal data.

FIG. 16 is a depiction of the time-frequency representations of the same primary singular value data 1402 shown in FIG. 14, but highlights regions 1602-1614 representing maxima of singular values associated with dominant P-wave energy zones. FIG. 17 represents a map 1700 of both an ideal azimuth localization vector 1706 between source location 402 and sensor 404, as well as estimated azimuth localization vectors 1708-1720 associated with the singular value maxima 1602-1614 respectively. The axes 1702 and 1704 correspond to the easting and northing directions respectively.

Figure 18:
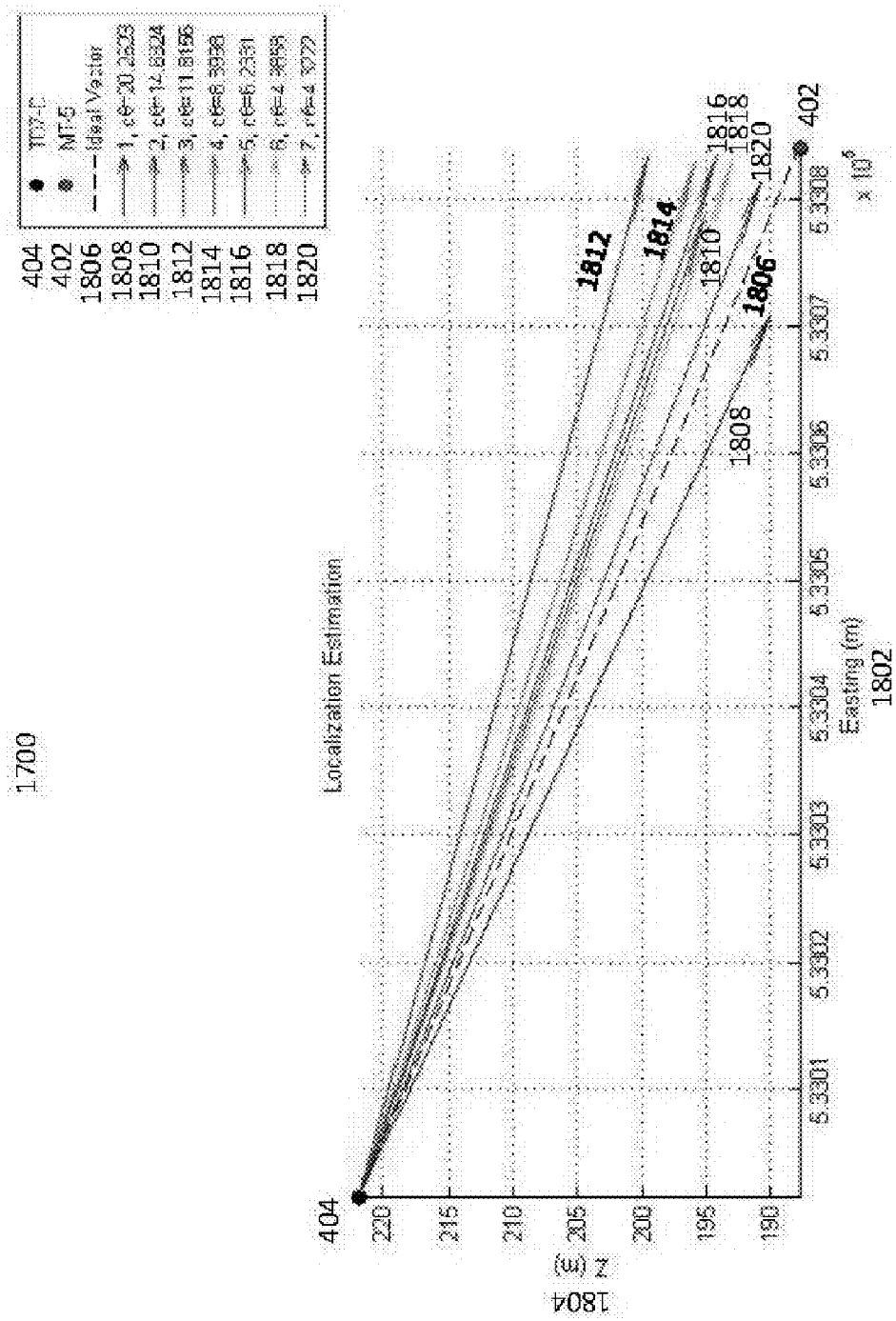
FIG. 18 illustrates another example graph of dip estimations based on singular value data extracted from a corresponding set of time-frequency representations of seismic signal data.

Similarly, FIG. 18 represents a map 1800 of both an ideal declination localization vector 1806 between source 402 and sensor 404, as well as estimated declination localization vectors 1808-1820 associated with the singular value maxima 1602-1614 respectively. In this example, the axes 1802 and 1804 correspond to the easting and z directions respectively.

The examples and data presented above show that the systems and processes disclosed can be utilized to successfully isolate separate polarizations of seismic wave using a single triaxial geophone sensor in order to determine a location of a nearby seismic source.

Various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems.

Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 19:
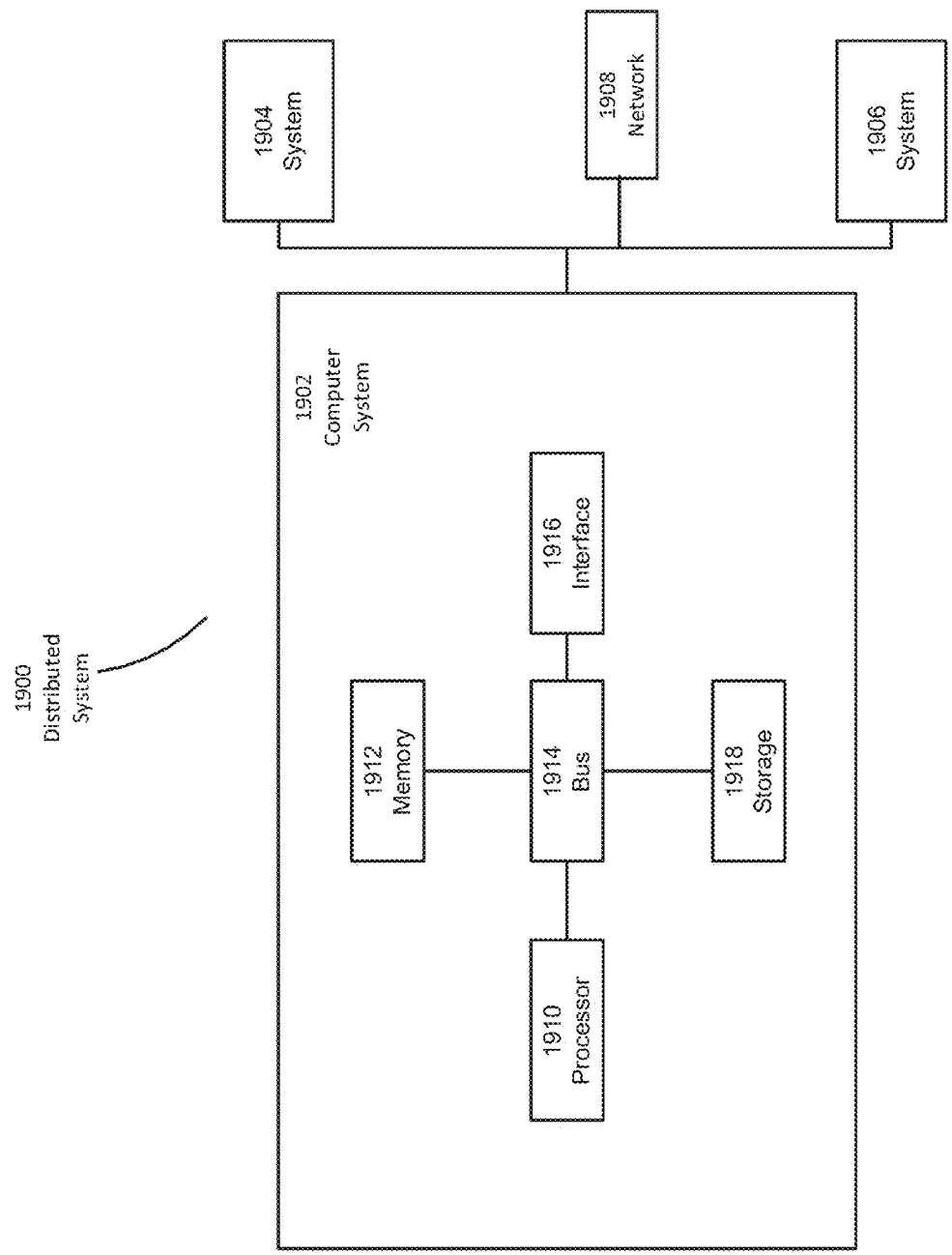
FIG. 19 illustrates an example computer system upon which various aspects in accord with the present invention may be implemented.

Referring to FIG. 19, there is illustrated a block diagram of a distributed computer system 1900, in which various aspects and functions are practiced. As shown, the distributed computer system 1900 includes one more computer systems that exchange information. More specifically, the distributed computer system 1900 includes computer systems 1902, 1904 and 1906. As shown, the computer systems 1902, 1904 and 1906 are interconnected by, and may exchange data through, a communication network 1908. The network 1908 may include any communication network through which computer systems may exchange data. To exchange data using the network 1908, the computer systems 1902, 1904 and 1906 and the network 1908 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1902, 1904 and 1906 may transmit data via the network 1908 using a variety of security measures including, for example, TLS, SSL or VPN. While the distributed computer system 1900 illustrates three networked computer systems, the distributed computer system 1900 is not so limited and may include any number of computer systems and computing devices, networked using any medium and communication protocol.

As illustrated in FIG. 19, the computer system 1902 includes a processor 1910, a memory 1912, a bus 1914, an interface 1916 and data storage 1918. To implement at least some of the aspects, functions and processes disclosed herein, the processor 1910 performs a series of instructions that result in manipulated data. The processor 1910 may be any type of processor, multiprocessor or controller. Some exemplary processors include commercially available processors such as an Intel Xeon, Itanium, Core, Celeron, or Pentium processor, an AMD Opteron processor, a Sun UltraSPARC, ARM processor, or IBM Power5+ processor and an IBM mainframe chip. The processor 1910 is connected to other system components, including one or more memory devices 1912, by the bus 1914. The memory 1912 stores programs and data during operation of the computer system 1902. Thus, the memory 1912 may be a relatively high performance, volatile, random access memory such as a dynamic random access memory (DRAM) or static memory (SRAM). However, the memory 1912 may include any device for storing data, such as a disk drive or other nonvolatile storage device. Various examples may organize the memory 1912 into particularized and, in some cases, unique structures to perform the functions disclosed herein. These data structures may be sized and organized to store values for particular data and types of data.

Components of the computer system 1902 are coupled by an interconnection element such as the bus 1914. The bus 1914 may include one or more physical busses, for example, busses between components that are integrated within a same machine, but may include any communication coupling between system elements including specialized or standard computing bus technologies such as IDE, SCSI, PCI and InfiniBand. The bus 1914 enables communications, such as data and instructions, to be exchanged between system components of the computer system 1902.

The computer system 1902 also includes one or more interface devices 1916 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1902 to exchange information and to communicate with external entities, such as users and other systems.

The data storage 1918 includes a computer readable and writeable nonvolatile, or non-transitory, data storage medium in which instructions are stored that define a program or other object that is executed by the processor 1910. The data storage 1918 also may include information that is recorded, on or in, the medium, and that is processed by the processor 1910 during execution of the program. More specifically, the information may be stored in one or more data structures specifically configured to conserve storage space or increase data exchange performance. The instructions may be persistently stored as encoded signals, and the instructions may cause the processor 1910 to perform any of the functions described herein. The medium may, for example, be optical disk, magnetic disk or flash memory, among others. In operation, the processor 1910 or some other controller causes data to be read from the nonvolatile recording medium into another memory, such as the memory 1912, that allows for faster access to the information by the processor 1910 than does the storage medium included in the data storage 1918. The memory may be located in the data storage 1918 or in the memory 1912, however, the processor 1910 manipulates the data within the memory, and then copies the data to the storage medium associated with the data storage 1918 after processing is completed. A variety of components may manage data movement between the storage medium and other memory elements and examples are not limited to particular data management components. Further, examples are not limited to a particular memory system or data storage system.

Although the computer system 1902 is shown by way of example as one type of computer system upon which various aspects and functions may be practiced, aspects and functions are not limited to being implemented on the computer system 1902 as shown in FIG. 19. Various aspects and functions may be practiced on one or more computers having a different architectures or components than that shown in FIG. 19. For instance, the computer system 1902 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1902 may be a computer system including an operating system that manages at least a portion of the hardware elements included in the computer system 1902. In some examples, a processor or controller, such as the processor 1910, executes an operating system. Examples of a particular operating system that may be executed include a Windows-based operating system, such as, Windows NT, Windows 2000 (Windows ME), Windows XP, Windows Vista, Windows 7, Windows 8, or Windows RT operating systems, available from the Microsoft Corporation, a MAC OS System X or iOS operating system available from Apple Computer, one of many Linux-based operating system distributions, for example, the Enterprise Linux operating system available from Red Hat Inc. or Android operating system from Google, Inc., a Solaris operating system available from Oracle Corporation, or a UNIX operating systems available from various sources. Many other operating systems may be used, and examples are not limited to any particular operating system.

The processor 1910 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used.

Alternatively, functional, scripting, or logical programming languages may be used. Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of processing seismic data using a single triaxial geophone, the method comprising:
    calibrating the single triaxial geophone sensor to determine a position and an orientation relative to a surrounding environment;
    configuring the single triaxial geophone sensor to receive seismic data from the surrounding environment along three orthogonal axes;
    measuring, with the single triaxial geophone sensor, a plurality of time series of seismic data from the surrounding environment for the three orthogonal axes;
    storing, with a computer system coupled to the single triaxial geophone sensor, the time series of seismic data from the surrounding environment for the three orthogonal axes; and
    processing, with the computer system, the plurality of time series of seismic data to identify a plurality of seismic waves of different polarizations, the processing including:
        determining a plurality of analytic representations of the plurality of time series of seismic data from the surrounding environment for the three orthogonal axes;

transforming the plurality of analytic representations into a corresponding plurality of time-frequency representations;

applying a first fixed-width temporal window to the plurality of time-frequency representations to extract a first plurality of time-frequency samples for the three orthogonal axes;

merging the first plurality of time-frequency samples for the three orthogonal axes into a first matrix;

calculating a first singular value decomposition of the first matrix containing the first plurality of time-frequency samples for the three orthogonal axes to determine a first plurality of singular values and a first plurality of singular vectors associated with the first fixed-width temporal window;

ordering the first plurality of singular values based on numerical value;

determining a first signal to noise ratio indicative of a seismic source; and determining a first extent of signal polarization present in the seismic data, including calculating a first metric using the ordered first plurality of singular values that are greater than a first threshold to identify an s-wave.

2. The method of claim 1, wherein processing the seismic data further comprises:

applying a second fixed-width temporal window time-shifted from the first fixed-width temporal window to the plurality of time-frequency representations to extract a second plurality of time-frequency-samples for the three orthogonal axes;

merging the second plurality of time-frequency samples for the three orthogonal axes into a second matrix;

calculating a second singular value decomposition of the second matrix containing the second plurality of time-frequency samples for the three orthogonal axes to determine a second plurality of singular values and a second plurality of singular vectors associated with the second fixed-width temporal window;

ordering the second plurality of singular values based on numerical value;

determining a second signal to noise ratio indicative of the seismic source;

determining a second extent of signal polarization present in the seismic data; and calculating a second metric using the ordered second plurality of singular values to identify a linearly polarized p-wave.

3. The method of claim 2, wherein processing the seismic data further comprises calculating the second metric using the ordered second plurality of singular values to identify the presence of the s-wave.

4. The method of claim 2, wherein processing the seismic data further comprises repeating the actions of claim 2 for a plurality of fixed-width temporal windows that are mutually time-shifted for extracting separate distinct pluralities of time-frequency samples to cover the temporal range of the plurality of time-frequency representations and to determine separate pluralities of singular values and singular vectors associated with each of the separate pluralities of mutually time-shifted time-frequency samples.

5. The method of claim 4, wherein processing the seismic data further comprises repeating the actions of claim 3 for the plurality of fixed-width temporal windows that are mutually time-shifted to identify the presence of the s-wave in each of the plurality of fixed-width temporal windows.

6. The method of claim 4, wherein processing the seismic data further comprises:

merging the first plurality of singular values, the second plurality of singular values, and the separate pluralities of singular values associated with each of the separate distinct pluralities of mutually time-shifted time-frequency samples; and determining an appropriate fixed-width time window containing a maxima of the plurality of singular values associated with each of the three orthogonal axes, wherein the temporal location of the maxima indicate the appropriate time window to extract polarization information.

7. The method of claim 6, wherein processing the seismic data further comprises:

processing a plurality of singular vectors associated with the appropriate fixed-width time window containing the maxima of the plurality of singular values; and estimating an azimuth and a declination of the seismic source relative to the single triaxial geophone sensor.

8. The method of claim 6, wherein processing the seismic data further comprises:

determining a first time onset of the linearly polarized p-wave;

determining a second time onset of the s-wave;

estimating a first local propagation speed of the linearly polarized p-wave;

estimating a second local propagation speed of the s-wave;

calculating a time difference of arrival of the p-wave and the s-wave; and estimating a location of the seismic source relative to the single triaxial geophone sensor.

* * * * *